US011044764B2

(12) United States Patent
Myers, III et al.

(10) Patent No.: US 11,044,764 B2
(45) Date of Patent: Jun. 22, 2021

(54) ROAMING OF A DEVICE BETWEEN STATIONARY DEVICES AND MOBILE DEVICES

(71) Applicant: Ayla Networks, Inc., Santa Clara, CA (US)

(72) Inventors: Daniel J. Myers, III, Fremont, CA (US); Peter Hunt, Sunnyvale, CA (US); Pankaj K. Gupta, Santa Clara, CA (US); Yipei Wang, Sunnyvale, CA (US)

(73) Assignee: Ayla Networks, Inc., Milpitas, CA (US)

( * ) Notice: Subject to any disclaimer, the term of this patent is extended or adjusted under 35 U.S.C. 154(b) by 343 days.

(21) Appl. No.: 15/799,625

(22) Filed: Oct. 31, 2017

(65) Prior Publication Data

US 2019/0132888 A1    May 2, 2019

(51) Int. Cl.
*H04W 76/10* (2018.01)
*H04W 12/06* (2021.01)
*H04W 84/04* (2009.01)
*H04W 8/12* (2009.01)
*H04W 4/80* (2018.01)
*H04L 29/06* (2006.01)
*H04W 88/08* (2009.01)
*H04W 4/18* (2009.01)
(Continued)

(52) U.S. Cl.
CPC ............ *H04W 76/10* (2018.02); *H04L 69/08* (2013.01); *H04W 4/80* (2018.02); *H04W 8/12* (2013.01); *H04W 12/06* (2013.01); *H04W 84/045* (2013.01); *H04W 88/08* (2013.01);

*H04L 67/10* (2013.01); *H04L 67/148* (2013.01); *H04W 4/18* (2013.01); *H04W 76/30* (2018.02)

(58) Field of Classification Search
None
See application file for complete search history.

(56) References Cited

U.S. PATENT DOCUMENTS 8,150,416 B2 * 4/2012 Ribaudo .............. G01S 5/0018
370/338
8,769,003 B2 7/2014 Aggarwal et al.
8,861,488 B2 10/2014 Vogety
(Continued)

OTHER PUBLICATIONS

European Patent Office, Extended European Search Report for European Application No. 18202095.8 dated Apr. 2, 2019.

*Primary Examiner* — Eleni A Shiferaw
*Assistant Examiner* — Bassam A Noaman
(74) *Attorney, Agent, or Firm* — Lowenstein Sandler LLP

(57) ABSTRACT

A mobile computing device includes one or more interfaces to connect to one or more devices, and one or more processing devices, connected with the one or more interfaces. The one or more processing devices are to establish a first wireless connection with a first device. The first device lacks resources to connect to a cloud service directly. The one or more processing devices are also to receive data from the first device, provide the data to the cloud service, and in response to detecting a migration condition, disconnect the first wireless connection to allow establishment of a second wireless connection between the first device and a second device such that the second device receives subsequent data from the first device and provides the subsequent data to the cloud service.

20 Claims, 14 Drawing Sheets

(51) Int. Cl.
*H04L 29/08* (2006.01)
*H04W 76/30* (2018.01)

(56) References Cited

U.S. PATENT DOCUMENTS

| | | | |
|---|---|---|---|
| 2013/0282438 A1* | 10/2013 | Hunter | G01S 1/02 |
| | | | 705/7.32 |
| 2014/0173439 A1* | 6/2014 | Gutierrez | G08B 21/0236 |
| | | | 715/727 |
| 2016/0150350 A1* | 5/2016 | Ingale | H04W 4/70 |
| | | | 370/255 |
| 2017/0064045 A1 | 3/2017 | Pai et al. | |
| 2017/0185956 A1* | 6/2017 | Gollu | G05B 15/02 |
| 2017/0257806 A1 | 9/2017 | Laganier et al. | |
| 2017/0311368 A1* | 10/2017 | Kandur Raja | H04W 76/14 |
| 2017/0374490 A1* | 12/2017 | Schoppmeier | H04L 67/12 |

\* cited by examiner

ROAMING OF A DEVICE BETWEEN STATIONARY DEVICES AND MOBILE DEVICES

BACKGROUND

Various devices with embedded systems include resources to connect to a computing device via a short-range communication protocol, such as BLUETOOTH®, ZIG-BEE®, etc. However, some of the devices with embedded systems lack the resources to connect to a wide area network (WAN) service directly. Further, once a connection to the computing device is established, the device with the embedded system may stay connected to the computing device even when it may be undesirable to do so. For example, maintaining the connection with the same computing device may include one or more drawbacks related to latency, bandwidth, security, and so forth.

BRIEF DESCRIPTION OF THE DRAWINGS

Reference will now be made to the accompanying drawings showing example embodiments of the present application, and in which.

DESCRIPTION OF EXAMPLE EMBODIMENTS

Figure 1:
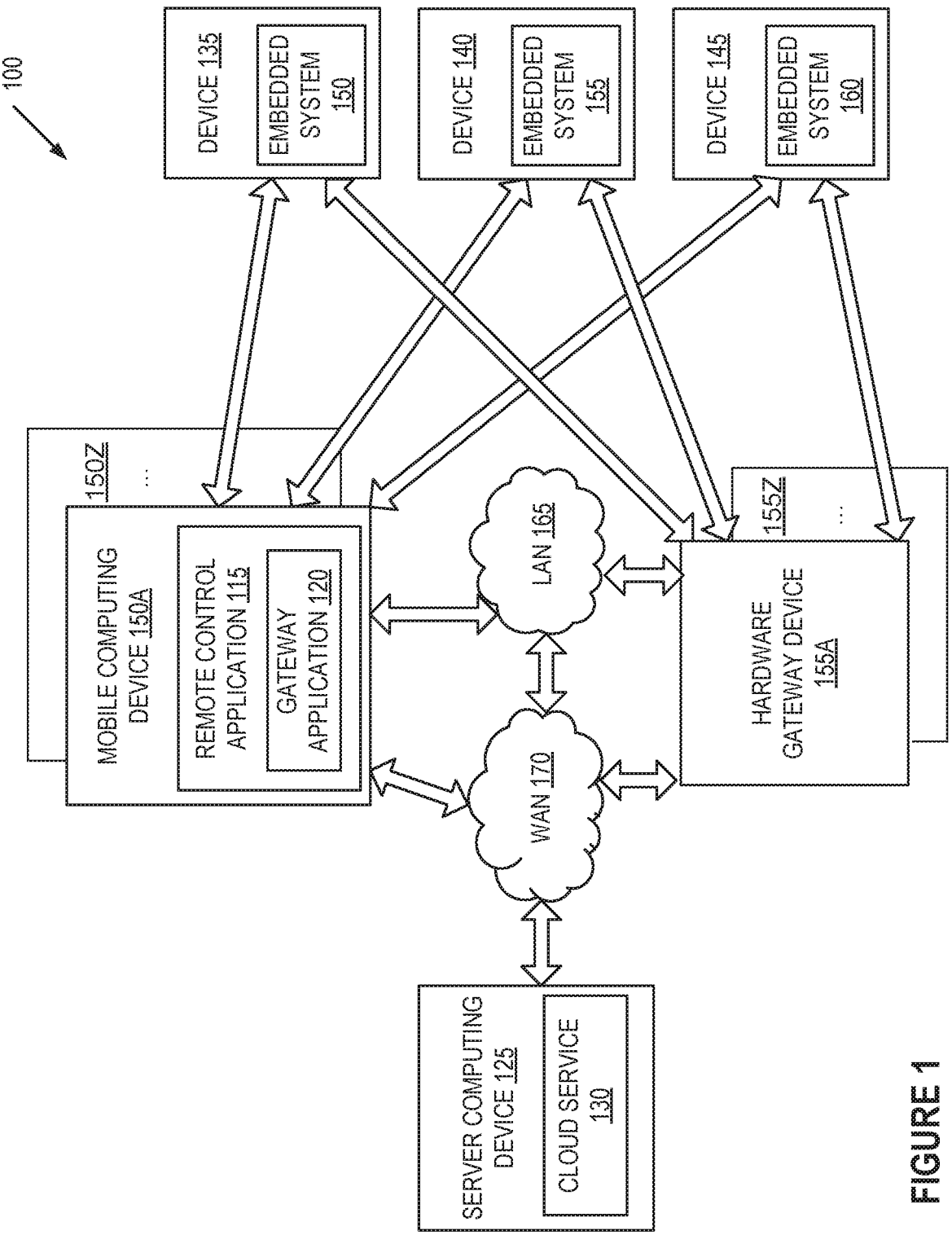
FIG. 1 is a block diagram depicting an example network architecture including remotely accessible embedded systems.

Embodiments are directed to roaming of a device between mobile computing devices (e.g., mobile gateways) and/or stationary computing devices (e.g., stationary gateways) that are connected to a wide area network (WAN) service (referred to as a cloud service, herein). The device may lack resources to connect to the cloud service directly, but the device may include resources to connect to the mobile computing device and the stationary computing device (e.g., gateway). For example, the device may be a BLUETOOTH® device that pairs with the mobile computing device (e.g., a smartphone). The mobile computing device may include an application that controls the operation of the device and/or a gateway application that sends data received from the device to the cloud service. As such, the mobile computing device may operate as a gateway to the cloud service for the device.

Upon being notified of the connection between the mobile computing device and the device, the cloud service may authenticate the device. In instances where a mobile computing device is connected to the device, the cloud service may use user credentials of a user account associated with the mobile computing device to authenticate the device. If authentication succeeds, and this is the first time the cloud service is made aware of the device, the cloud service may create a virtual device for the device and register the device to the user account associated with the mobile computing device. The virtual device may also be associated with a unique hardware identifier of the device. Associating the virtual device with the unique hardware identifier of the device may enable recognizing data received for the device from any computing device (e.g., stationary or mobile). Further, the cloud service can store the data for the device and perform analytics on the data.

In response to an occurrence of a migration condition, a connection may be established between the device and another computing device (e.g., a stationary computing device) that is also connected to the cloud service. A migration condition may include the application on the mobile computing device reaching a threshold number of connected devices, the device, the mobile computing device, and/or the stationary computing device entering or exiting a defined proximity to one another, a preference set by the owner of the device, and so forth.

This other computing device may notify the cloud service of the connection to the device and the cloud service may authenticate the device. In instances where the device is connected to a stationary computing device, such as a hardware gateway device, the cloud service may use device credentials (e.g., device identifier and a key embedded by the cloud service) to authenticate the device. If authentication succeeds, the other computing device may provide subsequent data received from the device to the cloud service. The cloud service may recognize, based on the unique hardware identifier, the subsequent data is for the device and store the subsequent data for the device.

In some instances, the device may be shared with a guest user account. For example, if the device is a baby monitor and the owner of the device hires a babysitter to watch a child while the owner leaves, the owner may share the baby monitor with a guest user account for the babysitter. In such a scenario, a migration condition may occur when the owner leaves a defined proximity to the baby monitor (e.g., leaves the house) and the baby monitor may connect to a mobile computing device of the babysitter. Data received by the mobile computing device of the babysitter may be sent to the cloud service. The cloud service may associate the data received from the babysitter's mobile computing device with the guest user account and store the data for the device. The data may also be associated with the user account of the owner. The data received from a mobile computing device of the owner may be partitioned from the data received from the mobile computing device of the babysitter by associating the different user accounts with the data. In an embodiment, the data may be presented together in a user interface, and the owner may control which users can see the various data received from different mobile computing devices.

Some benefits of providing the mobile computing device as a gateway may include enabling data collection and analysis in a cloud service for a device that is not capable of connecting to the cloud service directly. Further, some benefits of migrating the device between computing devices connected to the cloud service based on migration conditions may include enhancing the device's data transfer to the cloud service by using a computing device with a faster connection or fewer connections and may enhance data retention (e.g., reduce lost data) by attempting to maintain a near constant gateway connection to the cloud service for the device.

Referring now to the figures, FIG. 1 is a block diagram depicting an example network architecture 100 including remotely accessible embedded systems and computing devices that interact with the embedded systems. The network architecture 100 includes one or more mobile computing devices 150A-Z and one or more hardware gateway devices 155A-Z connected to a local area network (LAN) 165. The network architecture 100 also includes multiple devices 135, 140, 145 connected to the mobile computing devices 150A-Z and/or the hardware gateway devices 155A-Z. The devices 135-145 are devices with embedded systems 150, 155, 160, and may include, for example, electrical appliances such as refrigerators, ovens, washers, driers, dishwashers, thermostats, alarms, air conditioners, televisions, radios, receivers, amplifiers, and so forth. The devices 135-145 may also include consumer devices such as digital watches, music players, game consoles, digital cameras, printers, and so forth. Other examples of devices 135-145 include stationary devices such as HVAC systems, traffic lights, factory controllers, signs, electronic billboards, sprinkler systems, and irrigation control systems, as well as medical devices. Devices 135-145 may also be any other type of device that includes an embedded system 150, 155, 160.

An embedded system 150-160 is a class of computing device that is embedded into another device 135-145 as one component of the device 135-145. The device 135-145 typically also includes other hardware, electrical and/or mechanical components that may interface with the embedded system. Embedded systems 150-160 are typically configured to handle a particular task or set of tasks, for which the embedded systems 150-160 may be optimized. Accordingly, the embedded systems 150-160 may have a minimal cost and size as compared to general computing devices.

The embedded systems 150-160 may each include a communication module (not shown) that enables the embedded system 150-160 (and thus the device 135-145) to connect directly to the mobile computing devices 150A-150Z and/or the hardware gateway devices 155A-Z. The communication module may be configured to manage security, manage sessions, manage communications with external devices, and so forth. In one embodiment, the communication module may be configured to communicate using BLUETOOTH®, ZIGBEE®, Internet Protocol version 6 over Low power Wireless Area Networks (6LOWPAN®), Thread, or other PAN communication protocols. The embedded systems 150-160 may lack resources or components that enable communication with wide area networks, such as the Internet.

The LAN 165 may include a router, switch, bridge or other network device (not shown) that enables communication between multiple devices (e.g., mobile computing devices 150A-Z, stationary computing devices 155A-Z, etc.) connected to the LAN 165. The network device may provide wired connections to the LAN using, for example, Ethernet ports, universal serial bus (USB) ports and/or Firewire® ports. The network device may additionally provide wireless connections to the LAN using, for example, a Wi-Fi transceiver.

The LAN 165 is connected to a wide area network (WAN) 170. The WAN 170 may be a private WAN (e.g., an intranet) or a public WAN such as the Internet, or may include a combination of a private and public network. The LAN 165 may include a router and/or modem (e.g., a cable modem, a direct serial link (DSL) modem, a Worldwide Interoperability for Microwave Access (WiMAX®) modem, an long term evolution (LTE®) modem, etc.) that provides a connection to the WAN 170.

The mobile computing devices 150A-Z may include portable devices such as electronic book readers, portable digital assistants, mobile phones, laptop computers, portable media players, tablet computers, cameras, video cameras, netbooks, notebooks, and the like. Hardware gateway devices 155A-Z may include traditionally stationary computing devices such as a hub, a relay, a bridge, a desktop computer, and the like. A gateway is a network node that connects two networks using different protocols together. Hardware gateway devices 155A-Z may use hardware and/or firmware to perform gateway operations (e.g., translating messages between network protocols). The hardware gateway device 155A may translate between two or more different network protocols (e.g., between BLUETOOTH® and TCP/IP, between ZIGBEE® and TCP/IP, and so on). The hardware gateway device 155A-Z may contain hardware modules that connect to multiple different types of networks, and may additionally include hardware modules, firmware modules and/or software modules that translate data (e.g., packets) between the different network protocols. The mobile computing device 150A-Z may be a software gateway that includes a gateway application 120 that translates between network protocols. Optionally, some stationary computing devices (not shown) such as desktop computers, routers, etc. may include a gateway application that enables the stationary computing device to act as a software gateway.

The mobile computing devices 150A-Z and the hardware gateway device 155A-Z may each connect to the devices 135-145 via a short-range communication protocol (e.g., BLUETOOTH®, ZIGBEE®, Thread, etc.), as noted above. Each device 135-145 may just be connected to either one mobile computing device or one stationary computing device at a given time in embodiments. The connection between the devices 135-145 and the mobile computing device 150A-Z or the hardware gateway devices 155A-Z may occur under certain circumstances or migration conditions. For example, the device 135 may connect to the mobile computing device 150A or the hardware gateway device 155A when the mobile computing device 150A or the hardware gateway device 155A is within a predefined proximity (e.g., range) of the device 135. Additionally, a user may specify a preference for the device 135 to connect to the hardware gateway device 155A or the mobile computing device 150A when the mobile computing device 150A or the hardware gateway device 155A is in range.

There may be various migration conditions, as explained in detail below with reference to FIGS. 4A-G that cause the device 135 to migrate connections from one mobile computing device to another mobile computing device, from a mobile computing device to a hardware gateway device, from a hardware gateway device to a mobile computing device, and/or from one hardware gateway device to another hardware gateway device.

The mobile computing devices 150A-Z and the hardware gateway devices 155A-Z are also connected to the wide area network (WAN) 170. In one embodiment, the hardware gateway devices 155A-Z may be gateway devices and may be directly connected to the WAN 170 (e.g., via a wired or wireless connection). In some embodiments, the mobile computing devices 150A-Z and the hardware gateway devices 155A-Z may be connected to the WAN 170 via the LAN 165. Once the mobile computing devices 150A-Z go out of range of the LAN 165, the mobile computing devices 150A-Z may also connect to the WAN 170 through a connection with a wireless carrier system (e.g., though a global system for mobile communications (GSM), code division multiple access (CDMA), wideband code division multiple access (WCDMA), time division multiple access (TDMA), universal mobile telecommunications system (UMTS), long term evolution (LTE), worldwide interoperability for microwave access (WiMAX) or other wireless communication protocol connection).

The WAN 170 may be a private WAN (e.g., an intranet) or a public WAN such as the Internet, or may include a combination of a private and public network. The WAN 170 may include or connect to a server computing device 125. The server computing device 125 may include a physical machine and/or a virtual machine hosted by a physical machine. The physical machine may be a rackmount server, a desktop computer, or other computing device. In one embodiment, the server computing device 125 includes a virtual machine managed and provided by a cloud provider system. Each virtual machine offered by a cloud service provider may be hosted on a physical machine configured as part of a cloud. Such physical machines are often located in a data center. The cloud provider system and cloud may be provided as an infrastructure as a service (IaaS) layer. One example of such a cloud is Amazon's® Elastic Compute Cloud (EC2®).

The server computing device 125 hosts a cloud service 130, which may be a web-based service hosted in a cloud computing platform. The cloud service 130 (also referred to as a WAN accessible service) may maintain a session (e.g., via a continuous or intermittent connection) with the mobile computing devices 150A-Z and/or the hardware gateway devices 155A-Z. Alternatively, the cloud service 130 may periodically establish sessions with the mobile computing devices 150A-Z and/or the hardware gateway devices 155A-Z.

The mobile computing devices 150A-Z may each include a remote control application 115. The remote control application 115 may further include a gateway application 120. Alternatively, the gateway application 120 may be a separate application from the remote control application 115.

The remote control application 115 is configured to interface with and/or control one or more of the devices 135-145 via the devices' embedded systems 150-160. In one embodiment, the mobile computing devices 150A-Z include separate remote control applications for each of the embedded systems 150-160. Alternatively, the mobile computing devices 150A-Z may include a single remote control application that is capable of communicating with and controlling embedded systems 150-160 for multiple different devices 135-145. Some devices 135-145 are not controllable, and merely transmit data. For such devices, the remote control application 115 may receive such data and send the data on to the cloud service 130.

The remote control application 115 may maintain a virtual representation (e.g., virtual device) of each of the connected devices 135-145. For example, the remote control application 115 may include a library of device objects referred to as virtual devices herein. The virtual devices may refer to virtual representations of the devices 135-145. When one of the devices 135-145 pairs with the mobile computing device 150A, the remote control application 115 may create a virtual device that defines properties of the device 135-145, such as a unique hardware identifier, communication protocol (e.g., BLUETOOTH®), control parameters, connection types, connections, type of device, and so forth. As such, the virtual devices may include certain device data and/or states of the connected devices 135-145 that can be manipulated by the remote control application 115.

The gateway application 120 on the mobile computing devices 150A-Z may notify the cloud service 130 of the connection between the devices 135-145 and the mobile computing devices 150A-Z, and the hardware gateway devices 155A-Z may notify the cloud service 130 of the connection between the devices 135-145 and the hardware gateway devices 155A-Z. The cloud service 130 may receive the notifications of connections to devices 135-145 from the mobile computing devices 150A-Z and/or hardware gateway devices 155A-Z (or other stationary computing devices). The notifications may include a unique hardware identifier of the devices 135-145.

The cloud service 130 may authenticate the device 135-145 differently depending on whether the device 135-145 is connected to the mobile computing device 150A or the hardware gateway device 155A. For example, the cloud service 130 may use user based authentication to authenticate the device 135 connected to the mobile computing device 150A and the cloud service 130 may use device based authentication to authenticate the device 135 connected to the hardware gateway device 155A.

If the devices 135-145 are connected to the mobile computing device 150A or the hardware gateway device 155A for the first time, the cloud service 130 may create virtual devices for each device that define properties of the devices 135-145, similarly to the remote control application 115. The cloud service 130 may associate the virtual device on the server computing device 125 with the unique hardware identifier of the device. The virtual devices may include certain device data and/or states of the devices 135-145 connected to the mobile computing device 150A or the hardware gateway device 155A that can be manipulated by the cloud service 130. Also, when the notification is received from a mobile computing device 150A, the cloud service 130 may register a user account (e.g., owner user account) of the mobile computing device 150A with the virtual device for the device 135. Generating the virtual device and associating it with the device may be performed without the device being aware of the process.

In an embodiment, the cloud service 130 may dynamically query, via the gateway application 120, profile services that may be supported by the device 135 connected to either the mobile computing device 150A or the hardware gateway device 155A. The device may return certain communication protocol (e.g., BLUETOOTH®) profiles used by the device 135. The cloud service may receive the communication protocol profiles from the gateway application 120, and may dynamically generate one or more templates based on the communication protocol profiles. The templates may map characteristics or properties of the communication protocol in the profile to properties of a communication protocol used by the cloud service 130. The templates may be provided to the mobile computing devices 150A-Z and/or the hardware gateway devices 155A-Z for use in translating packets received from the devices to a format understood by the communication protocol used by the cloud service 130 and to translate packets sent from the cloud service 130 to a format understood by the communication protocol used by the devices.

The gateway application 120 may receive data from the connected devices 135-145 and provide the received data to the cloud service 130. Via a session with the mobile computing devices 150A-Z and/or the hardware gateway devices 155A-Z, cloud service 130 may receive the device's data (e.g., values, status updates) and may store the device's data in a data store on the server computing device 125. The device's data may be associated with the user account that is logged into the mobile computing device 150A that sent the data. The device's data may also be associated with the user account that is associated with a hardware gateway device 155A-Z.

Status updates received from the gateway application 120 and/or hardware gateway device 155A may identify values or states of some or all detectable parameters of devices 135-145 that the embedded systems are included in. Such values or states may change based on direct user interaction with the devices. Such values or states may also change responsive to commands sent to the embedded systems 150-160 by the cloud service 130 and/or by mobile computing devices 150A-Z. By maintaining or periodically establishing sessions with the mobile computing devices 150A-Z and the hardware gateway devices 155A-Z, the cloud service 130 may maintain up-to-date information on the states of the devices 135-145.

The cloud service 130 may also issue commands or provide data to the embedded systems through the gateway application 120 of the mobile computing device 150A or the hardware gateway device (which may be a stationary computing device) 155A. The commands may be commands to change a state of one or more parameters of a device controllable by the embedded system. For example, if the embedded system is embedded in a heater or thermostat, then the provided data may include temperature set points over a past amount of time or the commands may include commands to increase or decrease a temperature.

In one illustrative example, the device 135 may be connected to the mobile computing device 150A and may send data to the remote control application 115. The gateway application 120 may provide this received data for the device 135 to the cloud service 130. The cloud service 130 may recognize the data is for the device 135 based on the unique hardware identifier and store the data. In some instances, the cloud service 130 may update one or more states of the virtual device based on the received data for the device.

A migration condition may occur, such as the device 135 coming into a defined proximity to the hardware gateway device 155A. As such, the connection between the device 135 and the mobile computing device 150A may be disconnected and a new connection may be established between the device 135 and the hardware gateway device 155A to migrate the device to the hardware gateway device 155A. The hardware gateway device 155A may notify the cloud service 130 of the new connection, and the cloud service may perform authentication of the device 135 using the device credentials of the hardware gateway device 155A. Then, the hardware gateway device 155A may receive data from the device 135 and provide the data to the cloud service 130. The cloud service 130 may recognize the data is from the device 135 and store the data for the device.

This migration process may occur while the cloud service 130 maintains data history for the device 135 and recognizes the device 135 as the same device due to the unique hardware identifier regardless of which computing device (e.g., mobile computing device 150A or hardware gateway device 155A) to which the device 135 is connected. Further, the ownership profile is maintained by the cloud service 130 for the virtual device and access control is maintained throughout the migration process. It should be understood that the migration of the device 135 may occur between mobile computing devices 150A-Z, from a mobile computing device 150A and a hardware gateway device 155A, from a hardware gateway device 155A and a mobile computing device 150A, and between hardware gateway devices 155A-Z.

Figure 2A:
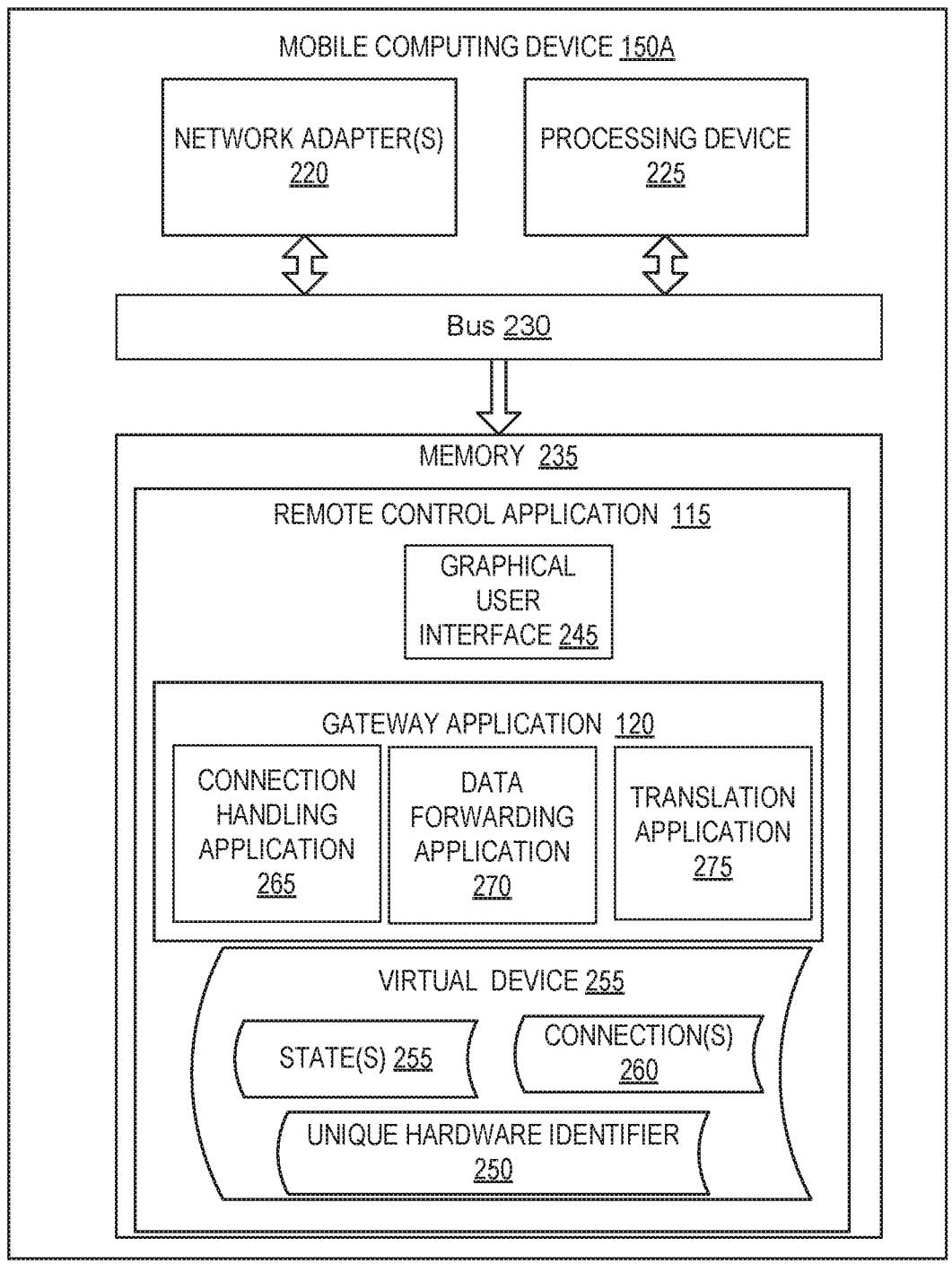
FIG. 2A is a block diagram of an example mobile computing device having a gateway application.

FIG. 2A is a block diagram of an example mobile computing device 150A having a remote control application 115 including a gateway application 120, in accordance with one embodiment. Alternatively, the gateway application 120 may be a separate application from the remote control application 115. In one embodiment, the mobile computing device 150A includes a network adapter 220, a processing device 225, a bus 230, and a memory 235. The network adapter 220, the processing device 225, and the memory 235 may be communicatively coupled via the bus 230. The memory 235 may store data and computer instructions that, when executed by the processing device 225, cause the processing device 225 to perform one or more operations. The mobile computing device 150A may also include numerous other components that are not shown herein. Examples of such additional components may include a display, a power supply, input/output ports, light emitting diodes (LEDs), fuses, digital to analog (D/A) converters, analog to digital (ND) converters, field programmable gate arrays (FPGAs), application specific integrated circuits (ASICs), and so on.

Figure 10:
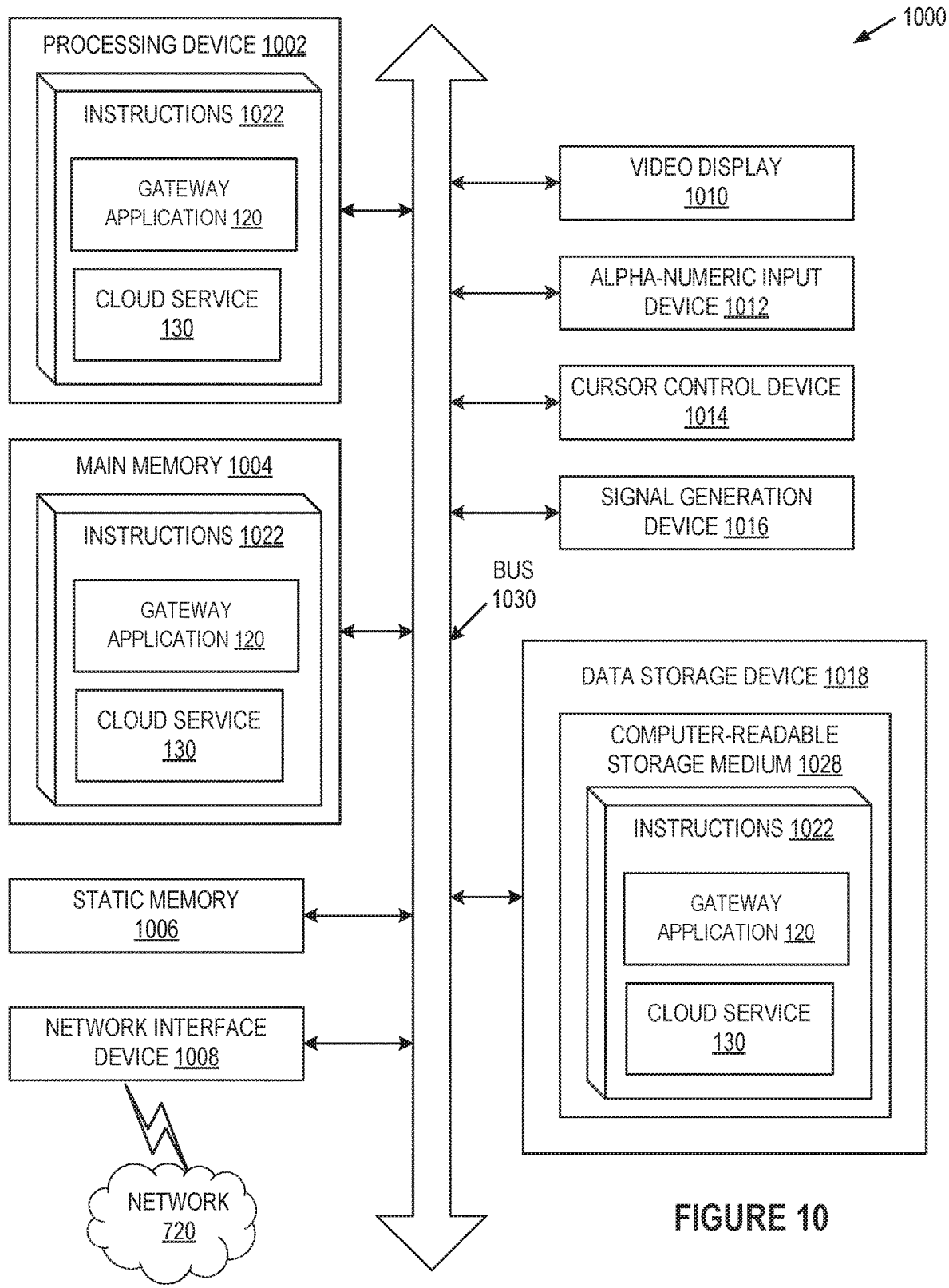
FIG. 10 illustrates a block diagram of one embodiment of a computing device.

The processing device may be any type of processing device discussed herein (e.g., with reference to FIG. 10). The memory 235 may include random access memory (RAM), read only memory (ROM), one time programmable (OTP) ROM, Flash (e.g., NOR Flash), or other types of memory. The memory 235 may additionally include a device state for the devices associated with the remote control application 115. The device state may include a present device state, historical device state, and/or changes made to the device state over a particular period.

The network adapter 220 may be a wired network adapter (e.g., an Ethernet adapter) or a wireless network adapter (e.g., a Wi-Fi adapter or other wireless local area network (WLAN) adapter). Network adapter 220 may also be configured to provide connection to a network or other devices using ZIGBEE®, PLC®, BLUETOOTH®, 6LOWPAN®, Thread, or other communication protocols. Network adapter 220 may receive notifications and other messages from the cloud service 130 and/or remote control applications. Network adapter 220 may additionally send outgoing messages to the cloud service 130 and/or to remote control applications.

The remote control application 115 and/or the gateway application 120 may be a program, plug-in, or library implemented by computer instructions stored in the memory 235. The gateway application 120 may be a module included in the remote control application 115. In some instances, the gateway application 120 may be separate from the remote control application 115. The processing device 225 may execute the instructions implementing the remote control application 115 and the gateway application 120. The remote control application 115 and/or the gateway application 120 may be programmed to run on various operating systems, such as Windows® operating systems, Unix® operating systems, iOS® operating systems, Android® operating systems and Java® operating systems to name a few. The remote control application 115 and/or the gateway application 120 may also be configured as firmware, or as hardware, or as some combination of software, firmware and/or hardware.

In one embodiment, the remote control application 115 may include a graphical user interface (GUI) 245. The GUI 245 of the remote control application 115 may enable users to interact with and control connected devices in an intuitive and user-friendly manner. The GUI 245 may provide a collection of graphical icons, visual indicators, buttons, toggles, sliders, and so forth that represent states and values of different parameters for the devices as well as controls for changing those states and values. A user may interact with the GUI 245 to cause the remote control application 115 to generate notifications, commands, property updates and other messages for the devices represented in the GUI 245.

The remote control application 115 may also have access to device data, which may include a unique hardware identifier for a device that the remote control application 115 is registered with, a last known IP address of the device and a last known device state of the device. In one embodiment, the unique hardware identifier includes a media access control (MAC) address of the embedded system. Alternatively, the unique hardware identifier may be a unique identifier assigned to the embedded system (or to a communication module in the embedded system) that is separate from the MAC address.

When the remote control application 210 is logged into a user account that is registered with a device including an embedded system, a virtual device 255 for the device may be generated by the remote control application 115 and associated with a unique hardware identifier 250 of the device. The virtual device 255 may include the device data (e.g., states 255) about the connected devices that is accessible to the remote control application 115. Additionally, or alternatively, the virtual device 255 may include one or more connections 260 to the device associated with the virtual device. For example, the connections 260 may indicate whether the device is connected via BLUETOOTH®, ZIGBEE®, Thread, or the like.

The gateway application 120 may include a connection handling application 265, a data forwarding application 270, and a translation application 275. The connection handling application 265 may establish a connection with the devices 135-145. Also, when a migration condition occurs that causes a connected device 135-145 to migrate to a connection with another computing device, the connection handling application 265 may disconnect with the device 135-145 that migrated.

The data forwarding application 270 may receive data from the connected devices 135-145. The translation application 275 may use one or more templates received from the cloud service 130. In one embodiment, the translation application 275 may dynamically generate the templates that map properties or characteristics of the communication protocol used by the connected devices to properties of a communication protocol used by the cloud service 130. The translation application 275 may translate data (e.g., packets) received from the device in a first format to a second format understood by the communication protocol used by the cloud service 130. The data forwarding application 270 may provide the reformatted data to the cloud service 130. Also, the data forwarding application 270 may receive data from the cloud service 130 and may use the templates to translate the data (e.g., packets) from to a format understood by the communication protocol of the device 135-145. Then, the data forwarding application 270 may provide the reformatted data to the devices 135-145.

Although the gateway application 120 is described with reference to the mobile computing device 150A, it should be understood that the gateway application 120 of a stationary computing device may include similar components and perform similar operations. For example, a gateway application of a stationary computing device may receive data from a connected device, translate it using a template, and provide the data to the cloud service 130, among other things. Additionally, a hardware gateway device 155A-Z may include hardware modules, firmware and/or software that performs similar functions of receiving data from a connected device, translating the data (e.g., using a template), and providing the data to the cloud service 130.

Figure 2B:
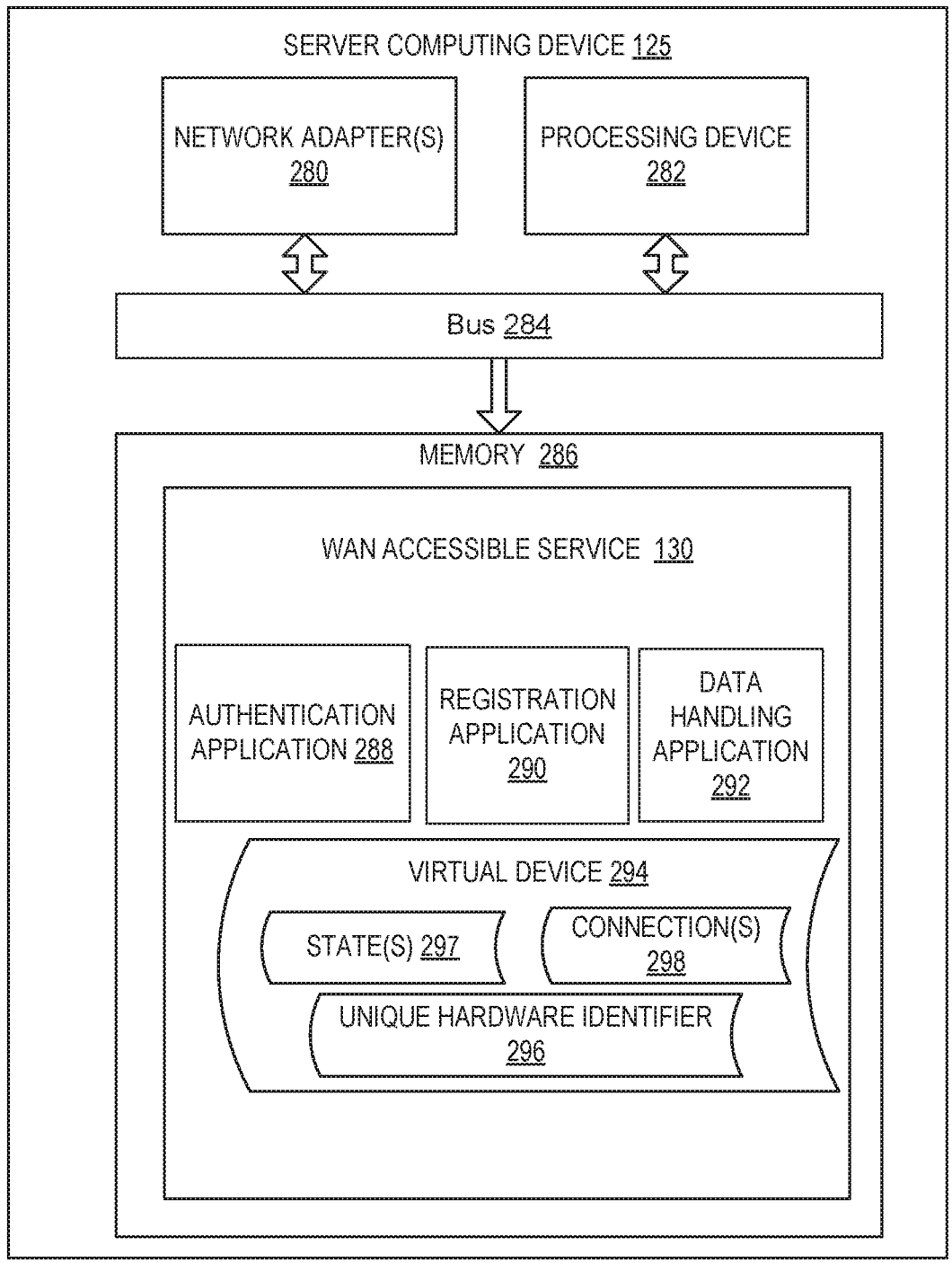
FIG. 2B is a block diagram of an example server computing device having a device management application.

FIG. 2B is a block diagram of an example server computing device 125 having a WAN accessible service (cloud service) 130, in accordance with one embodiment. In one embodiment, the mobile computing device 150A includes a network adapter 280, a processing device 282, a bus 284, and a memory 286. The network adapter 280, the processing device 282, and the memory 286 may be communicatively coupled via the bus 284. The memory 286 may store data and computer instructions that, when executed by the processing device 282, cause the processing device 282 to perform one or more operations. The server computing device 125 may also include numerous other components that are not shown herein. Examples of such additional components may include a display, a power supply, input/output ports, light emitting diodes (LEDs), fuses, digital to analog (D/A) converters, analog to digital (ND) converters, field programmable gate arrays (FPGAs), application specific integrated circuits (ASICs), and so on.

The processing device may be any type of processing device discussed herein (e.g., with reference to FIG. 10). The memory 286 may include random access memory (RAM), read only memory (ROM), one time programmable (OTP) ROM, Flash (e.g., NOR Flash), or other types of memory. The memory may include the cloud service 130.

The network adapter 280 may be a wired network adapter (e.g., an Ethernet adapter) or a wireless network adapter (e.g., a WIFI® adapter or other wireless local area network (WLAN) adapter). Network adapter 280 may also be configured to provide connection to a network or other devices using ZIGBEE®, PLC®, BLUETOOTH®, 6LOWPAN®, Thread, or other communication protocols. Network adapter 280 may receive notifications and other messages from the mobile computing devices 150A-Z and the hardware gateway devices 155A-Z. Network adapter 280 may receive data related to the devices 135-145 via the gateway application 120 on the mobile computing devices 150A-Z and the hardware gateway devices 155A-Z. Network adapter 280 may additionally send outgoing messages to the mobile computing devices 150A-Z, the hardware gateway devices 155A-Z, and/or the devices 135-145 via the gateway application 120 on the mobile computing devices 150A-Z and the hardware gateway devices 155A-Z.

The cloud service 130 may be a web service, program, plug-in, or library implemented by computer instructions stored in the memory 235. The processing device 225 may execute the instructions implementing the cloud service 130. The cloud service 130 may be programmed to run on various operating systems, such as Windows® operating systems, Unix® operating systems, iOS® operating systems, Android® operating systems and Java® operating systems to name a few. The cloud service 130 may also be configured as firmware, or as hardware, or as some combination of software, firmware and/or hardware.

The cloud service 130 may include an authentication application 288, a registration application 290, and a data handling application 292. The authentication application 288 may receive a notification from the mobile computing devices 150A-Z and/or the hardware gateway devices 155A-Z of a connection to the devices 135-145. The notification may include a unique hardware identifier for the device that is connected to the mobile computing devices 150A-Z and/or the hardware gateway devices 155A-Z. The authentication application 288 may determine what type of computing device sent the notification. If the determined type of computing device is the mobile computing device, then the authentication application 288 may perform user based authentication for the connected device by validating user credentials of the user account associated with the mobile computing device. If the determined type of computing device is the hardware gateway device, then the authentication application 288 may perform device based authentication for the connected device by validating device credentials of the hardware gateway device.

Upon authentication, the registration application 290 may determine whether the unique hardware identifier of the device is associated with a virtual device in the memory 286. If the unique hardware identifier is not associated with a virtual device, then the registration application 290 may create a virtual device 294 for the device and associate the unique hardware identifier 296 of the device with the virtual device 294. The registration application 290 may also register a user account associated with the mobile computing device that is logged into the remote control application 115. The virtual device 294 may include the device data (e.g., states 297) about the connected devices that may be used to control the devices and/or that is updated when device data is received from the gateway application 120. Additionally, or alternatively, the virtual device 294 may include one or more connections 298 to the device associated with the virtual device. For example, the connections 298 may indicate whether the device is connected via one of the mobile computing devices 150A-Z or the hardware gateway devices 155A-Z. Once the virtual device 294 is created, the data handling application 292 may receive data for the device and store the data for the device (e.g., by updating the states 297 and/or values of the virtual device 294).

If the unique hardware identifier of the device is already associated with a virtual device, then the data handling application 292 may receive data for the device and store data for the device (e.g., by updating states and/or values of the virtual device). The unique hardware identifier may already be associated with the virtual device 294 after the device is registered in the cloud service 130 and subsequent connections are made to the device via migration to other computing devices (e.g., mobile computing devices 150A-Z or hardware gateway devices 155A-Z).

The registration application 290 may also dynamically generate the templates for the device. Once generated, the cloud service 130 may provide the templates to the computing device that is connected to the device related to the templates.

In an embodiment, an owner of the device 135 may share the device 135 with a guest user account. Thus, when the device 135 connects to a mobile computing device 150B executing a remote control application 115 logged into with the guest user account, data may be received by the mobile computing device 150B from the device 135 and provided to the cloud service 130. The data handling application 292 may recognize that the data is from the same device 135 (e.g., based on the unique hardware identifier) and append the guest user account to the data to partition the data from the data associated with the user account of the device owner. The data handling application 292 may store the data associated with the guest user account.

In another embodiment, the gateway application 120 may not send any data collected from the device 135 when the guest user account is logged into the remote control application 115. In this way, the data may not be intermingled with data associated with the user account of the owner. This particular embodiment may be useful when the data collected by the device is particularly sensitive or personal (e.g., medical related).

Figure 3:
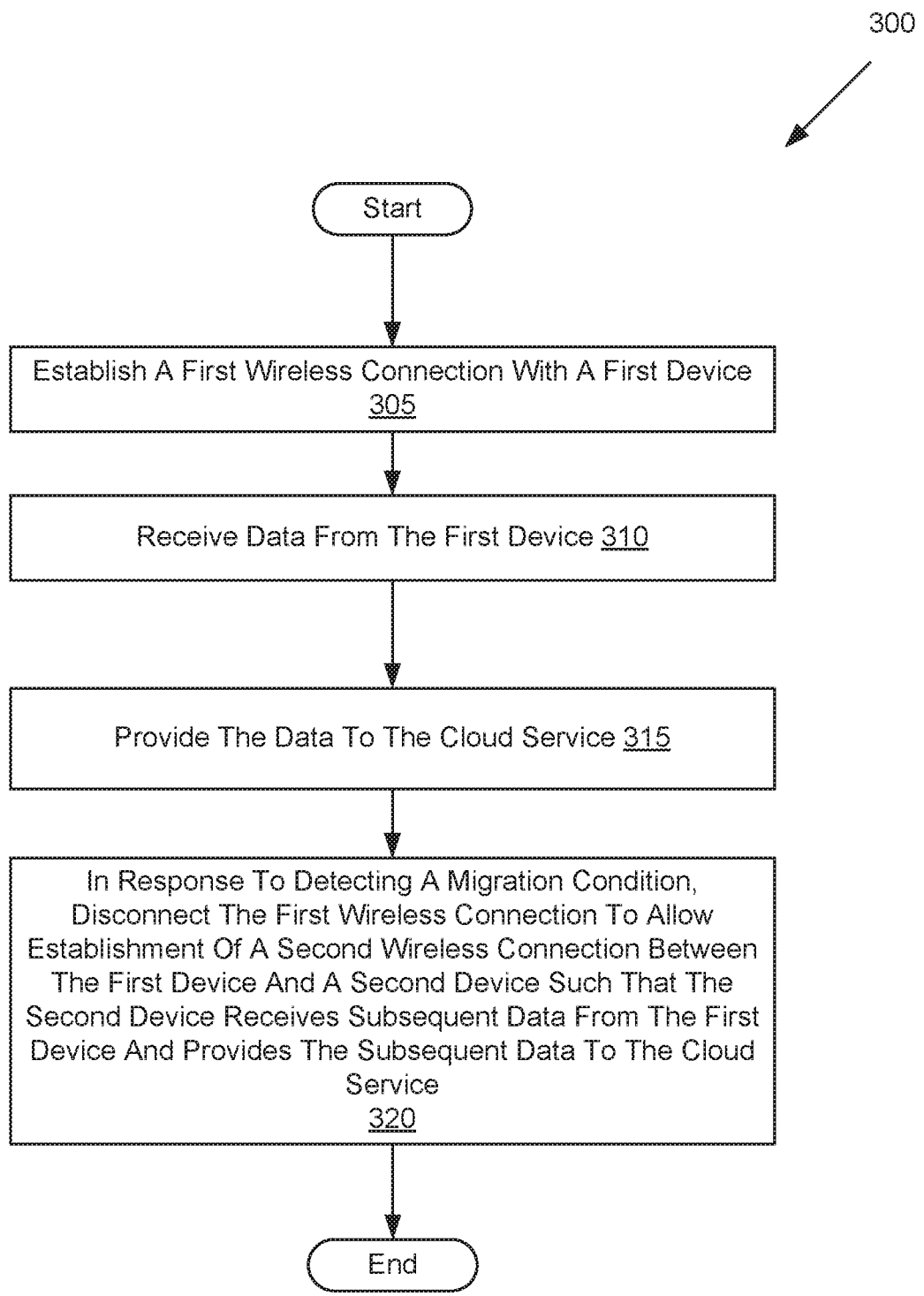
FIG. 3 is a flow chart of an example method of migrating a device between various computing devices connected to a cloud service.

FIG. 3 is a flow diagram of an example method 300 of migrating a device 135 between various computing devices connected to a cloud service 130. The method 300 may be performed by a processing logic that may comprise hardware (e.g., circuitry, dedicated logic, programmable logic, microcode, etc.), software (e.g., instructions run on a processing device to perform hardware simulation), or a combination thereof. In one embodiment, at least some operations of the method 300 are performed by a mobile computing device 150A executing a gateway application 120. In another embodiment, at least some operations of the method 300 are performed by a hardware gateway device 155A.

At block 305, processing logic establishes a first wireless connection with a first device. The device may be any of devices 135-145 and may include an embedded system with which a wireless connection is established. The first wireless connection may include a connection type (e.g., LAN, WAN, BLUETOOTH®, ZIGBEE®, etc.). One embodiment of authenticating the first device with the cloud service 130 and registering the first device with the cloud service 130 is set forth below with reference to FIG. 5. The first device may be uninvolved in the process of authentication and registration with the cloud service 130.

At block 310, processing logic receives data from the first device over the first wireless connection. The first device may lack resources to connect to the cloud service 130 directly. The processing logic may translate the data (e.g., packets) from a format specific to the communication protocol used by the first device to a format specific to the communication protocol used by the cloud service 130. One embodiment of such translation is set forth below with reference to FIG. 6.

At block 315, processing logic provides the data to the cloud service 130. In this way, when block 315 is performed by the mobile computing device 150A, the mobile computing device 150A may operate as a gateway to provide data from the device 135 to the cloud service 130. The first device may be unaware of its data being provided to the cloud service 130.

At block 320, processing logic, in response to detecting a migration condition, disconnects the first wireless connection to allow establishment of a second wireless connection between the first device and a second device such that the second device receives subsequent data from the first device and provides the subsequent data to the cloud service 130. In some embodiments, the second device may be a mobile computing device 150B or a hardware gateway device 155B. Examples of the migration condition are illustrated below with reference to FIGS. 4A-4G.

The cloud service 130 may authenticate the second device using a different authentication technique (e.g., device based) when the method 300 is performed by a mobile computing device 150A and the second device is a hardware gateway device 155A. Nevertheless, the cloud service 130 may recognize the subsequent data received by the second device as pertaining to the same device 135 (e.g., based on the unique hardware identifier) and may store the subsequent data for the device 135.

In an embodiment, processing logic, in response to detecting a second migration condition, reestablishes the first connection with the first device. Reestablishing the first connection may cause the second connection to disconnect.

FIGS. 4A-G illustrate examples of a device 135 migrating connections between hardware gateway devices 155A-Z and/or mobile computing devices 150A-Z that are connected to a cloud service 130. Migrating may refer to disconnecting a connection to an initial computing device and establishing a connection with a different computing device. The migration condition may refer to the mobile computing device 150A entering or exiting a defined proximity to the device 135, the device 135 entering or exiting a defined proximity to the mobile computing device 150A, the device 135 entering or exiting a predefined proximity to the hardware gateway device 155A, a preference (e.g., user selects that the device 135 connects to the mobile computing device 150A even when in range of the hardware gateway device 155A), the remote control application 115 of the mobile computing device 150A reaching a threshold number of connections to devices, or the like. It should be note that the examples shown in FIGS. 4A-G are for explanatory purposes and are not an exhaustive set of examples. The examples are not meant to limit the disclosure.

Figure 4A:
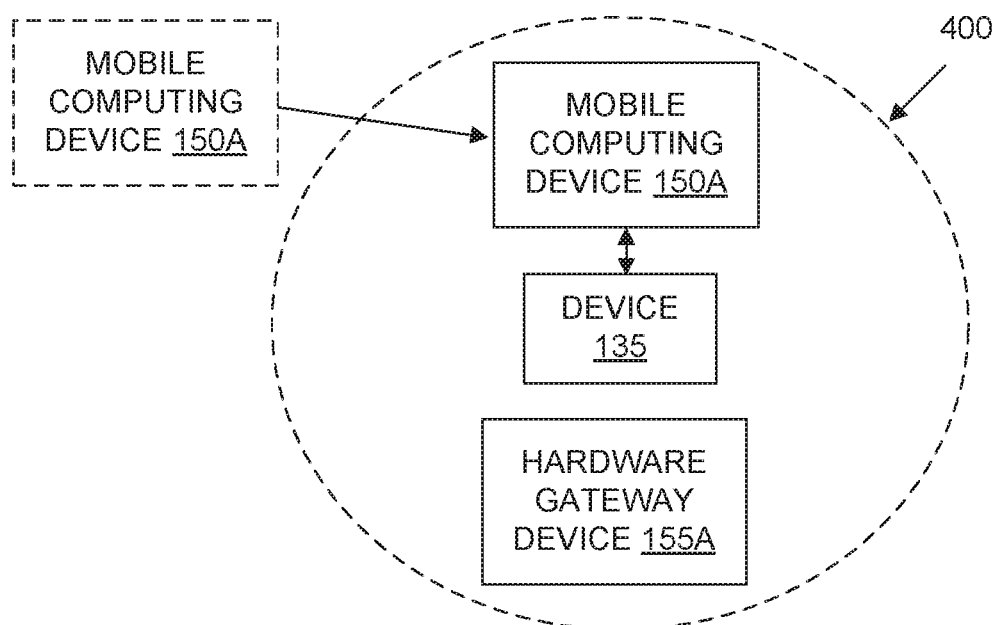
FIGS. 4A-4G illustrate examples of migrating a device between hardware gateway devices and/or mobile computing devices that are connected to a cloud service.

For example, in FIG. 4A, the hardware gateway device 155A is initially within a defined proximity 400 of the device 135 and the device is initially connected to the hardware gateway device 155A. The hardware gateway device 155A may be a gateway device that forwards data received from the device 135 to the cloud service 130. As represented by the dashed box for the mobile computing device 150A, the mobile computing device 150A is initially outside of the defined proximity 400. In this scenario, the mobile computing device 150A may be a mobile phone carried by a user. The user may have been outside of their house, and thus, the device 135 may be connected to the hardware gateway device 155A. When the user returns to the house, the mobile computing device 150A may enter the defined proximity 400 of the device 135 (migration condition) and the device 135 migrates its connection to the mobile computing device 150A, thereby disconnecting the connection with the hardware gateway device 155A. As such, the mobile computing device 150A may operate as a gateway and forward data received from the device 135 to the cloud service 130.

Figure 4B:
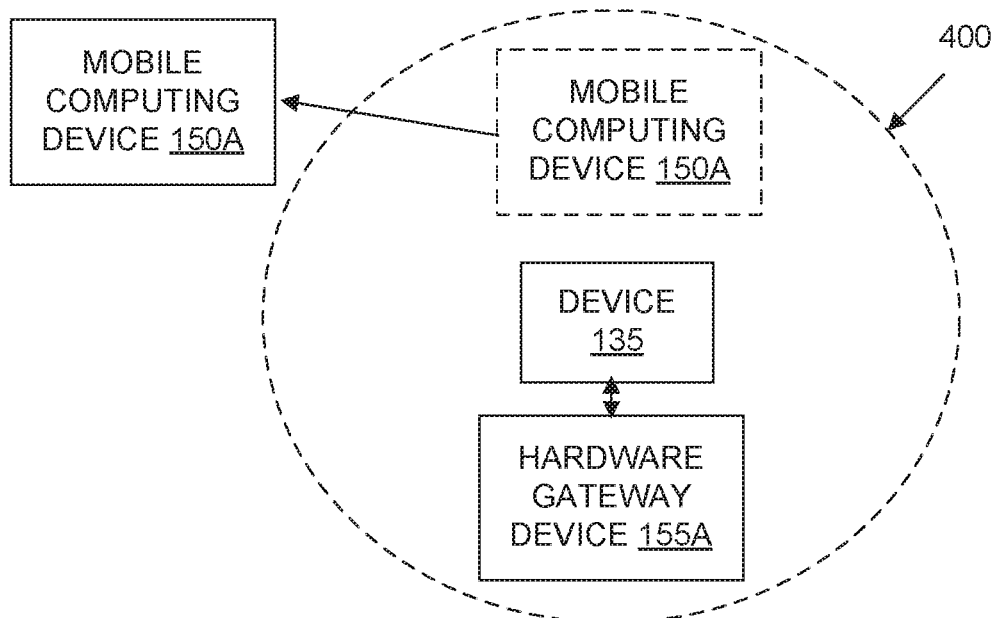

In FIG. 4B, the mobile computing device 150A is initially within the defined proximity 400 (represented by dashed box) and the device 135 is initially connected to the mobile computing device 150A. The mobile computing device 150A may be operating as a gateway and forwarding data received from the device 135 to the cloud service 130. The user may leave their house with the mobile computing device 150A, and thus, the mobile computing device 150A exits the defined proximity 400 to the device 135 (migration condition). Accordingly, the device 135 may migrate its connection to the hardware gateway device 155A and the connection with the mobile computing device 150A may disconnect. The hardware gateway device 155A may forward data received from the device 135 to the cloud service 130.

Figure 4C:
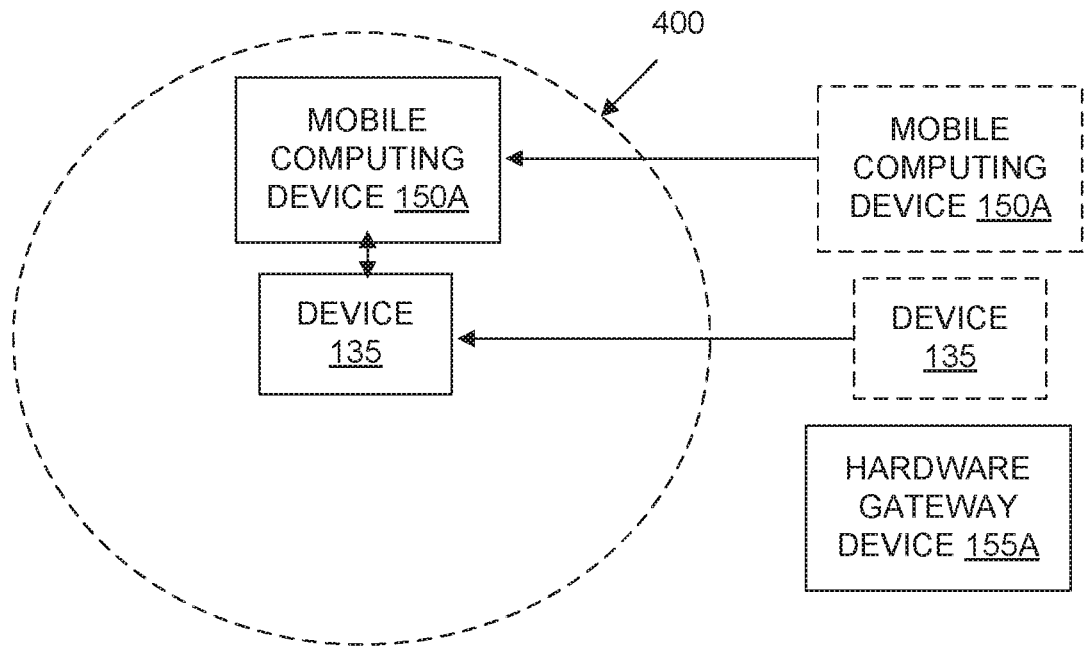

FIG. 4C illustrates an example where the device 135 is portable and carried by a user who also carries their mobile computing device 150A. For example, the device 135 may be a wearable health monitor. Initially, the device 135 shown as a dashed box may be connected to the hardware gateway device 155A (e.g., while the user is at home and the hardware gateway device 155A is within the defined proximity 400 of the device 135). The user may leave the house with their mobile computing device 150A and the device 135, thereby causing the hardware gateway device 155A to exit the defined proximity 400 to the device 135 (migration condition). As such, the device 135 may migrate its connection to the mobile computing device 150A that is within the defined proximity 400, as depicted. The mobile computing device 150A may operate as a gateway to provided received device data to the cloud service 130.

Figure 4D:
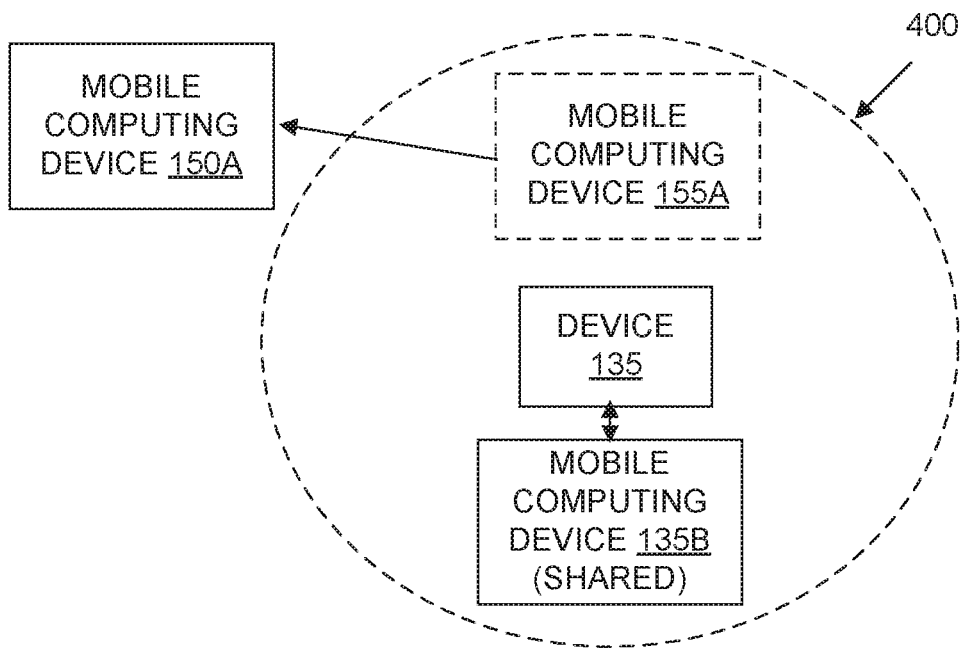

FIG. 4D illustrates an example where the owner of the device has shared the device 135 with another user account (e.g., guest user account). For example, the device 135 may be a baby monitor and the owner may share the baby monitor with a guest account associated with a mobile computing device 135B of the babysitter. Initially, the device 135 may be connected to the mobile computing device 155A, but the user may leave their house and the mobile computing device 150A may exit a defined proximity 400 to the device 135 (migration condition). Accordingly, the device 135 may migrate its connection to the mobile computing device 135B of the babysitter that is associated with the shared guest user account. The data received by the mobile computing device 135B from the device 135 may be provided to the cloud service 130 and the cloud service 130 may store the device data by associating it with the guest user account.

Figure 4E:
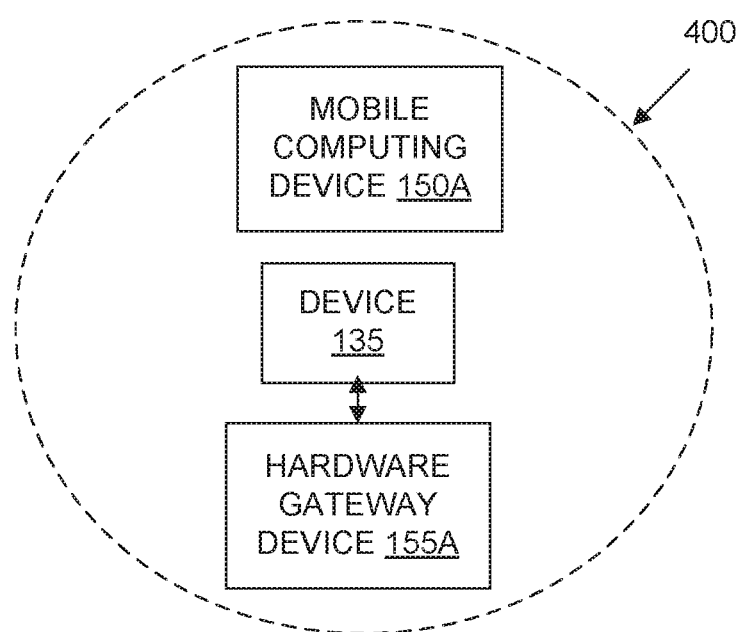

FIG. 4E illustrates an example where a remote control application 215 of a mobile computing device 150A reaches a threshold number of connections to devices and the connection with the device 135 is migrated to the hardware gateway device 155A. Initially, the device 135 may be connected to the mobile computing device 150A that is within the defined proximity 400 to the device 135. The mobile computing device 150A may add another connection to another device 140 and a threshold number of connections to devices may be reached (migration condition). As such, the connection between the mobile computing device 150A and the device 135 may be disconnected, and a connection between the device 135 and the hardware gateway device 155A may be established. The hardware gateway device 150A may provide received device data to the cloud service 130.

Figure 4F:
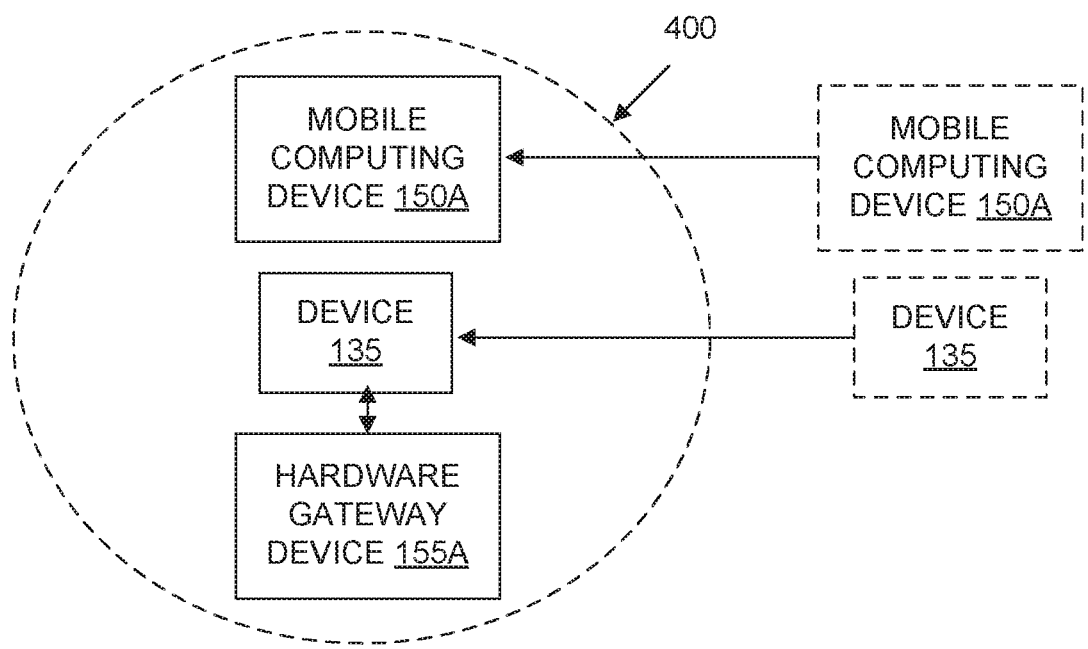

FIG. 4F illustrates an example illustrates an example where the device 135 is portable and carried by a user who also carries their mobile computing device 150A. For example, the device 135 may be a wearable health monitor. Initially, the device 135 shown as a dashed box may be connected to the mobile computing device 150A (e.g., while the user is out of the house and the hardware gateway device 155A is outside the defined proximity 400 of the device 135). The user may return to their house with their mobile computing device 150A and the device 135, thereby causing the hardware gateway device 155A to enter the defined proximity 400 to the device 135 (migration condition). As such, the device 135 may migrate its connection to the hardware gateway device 155A that is within the defined proximity 400, as depicted. The hardware gateway device 150A may provide received device data to the cloud service 130.

Figure 4G:
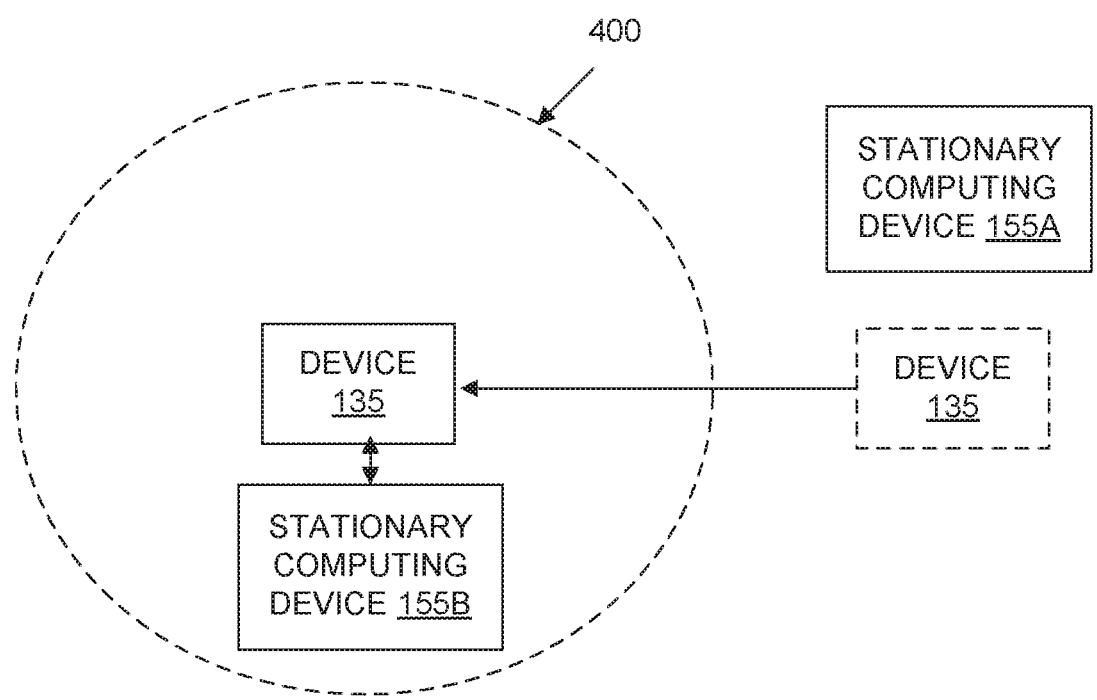

FIG. 4G illustrates an example where the connection of the device 135 migrates from one hardware gateway device 155A to another hardware gateway device 155B. The hardware gateway devices 155A and 155B may be at separate locations within a structure (e.g., user's house). The device 135 may be a portable device, such as a wearable or a baby monitor. Initially, the hardware gateway device 155A may be within the defined proximity 400 to the device 135 and the device 135 may be connected to the hardware gateway device 155A. The user may move the device 135 to another location in the structure and the stationary device 155A may exit the defined proximity 400 to the device 135 (migration condition) and/or the stationary device 155B may enter the defined proximity 400 to the device 135 (migration condition). As such, a connection may be established between the device 135 and the hardware gateway device 155B. The hardware gateway device 155B may provide received device data to the cloud service 130.

Figure 5:
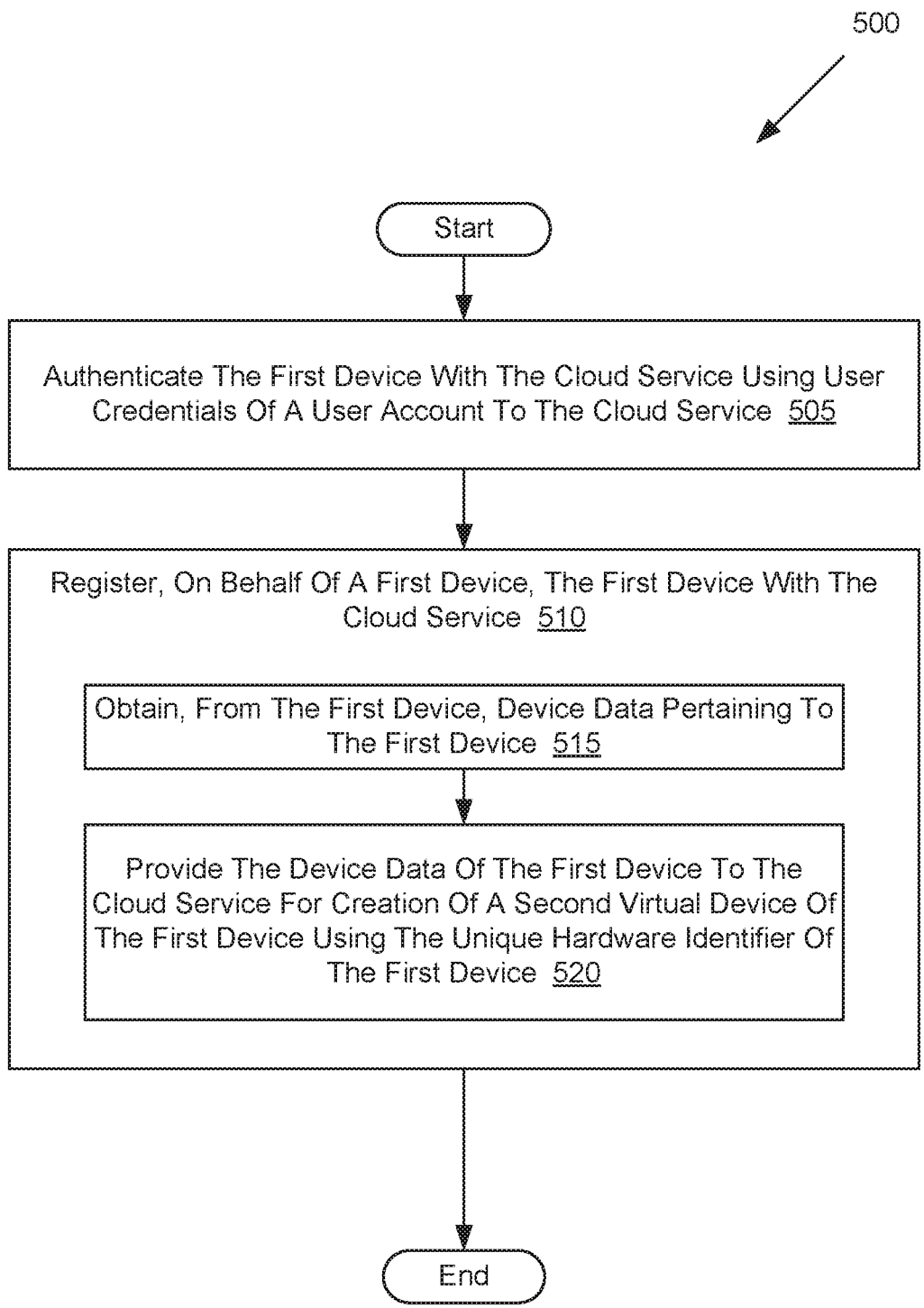
FIG. 5 is a flow chart of an example method of authenticating a device with a cloud service and registering the device with the cloud service.

FIG. 5 is a flow chart of an example method 500 of authenticating a device 135 with a cloud service 130 and registering the device 135 with the cloud service 130, in accordance with an embodiment. The method 500 may be performed by a processing logic that may comprise hardware (e.g., circuitry, dedicated logic, programmable logic, microcode, etc.), software (e.g., instructions run on a processing device to perform hardware simulation), or a combination thereof. In one embodiment, at least some operations of the method 500 are performed by a mobile computing device 150A executing a gateway application 120. In another embodiment, at least some operations of the method 500 are performed by a hardware gateway device 155A executing a gateway application 120.

It should be understood that prior to method 500 being executed, a first connection may be established between a first device (e.g., device 135) and the mobile computing device 150A or the hardware gateway device 155A. At block 505, in embodiments when the mobile computing device 150A performs the method 500, processing logic authenticates a first device (e.g., device 135) with the cloud service 130 using user credentials of a user account associated with the mobile computing device 150A. In embodiments where the hardware gateway device 155A performs the method 500, processing logic may authenticate the first device with the cloud service 130 using device credentials of the hardware gateway device 155A.

At block 510, processing logic registers, on behalf of the first device, the first device with the cloud service 130. The processing logic registers on behalf of the first device because the first device is not capable of connecting directly to the cloud service 130, and may not even be aware of the cloud service 130 or the fact that the device is represented in the cloud service. The first device may be unaware of the registration process on its behalf. Registration (block 510) may also include obtaining (block 515), from the first device, device data pertaining to the first device. The device data may include a unique hardware identifier of the first device, communication protocol used by the first device, device type, states and/or values, and the like. Registration (block 510) may also include providing (block 520) the device data of the first device to the cloud service 130 for creation of a virtual device 294 of the first device using the unique hardware identifier 296 of the first device. In some instances, the cloud service 130 may also register a user account logged into the remote control application 115 with the virtual device 296 when the mobile computing device 150A performs the registration.

Figure 6:
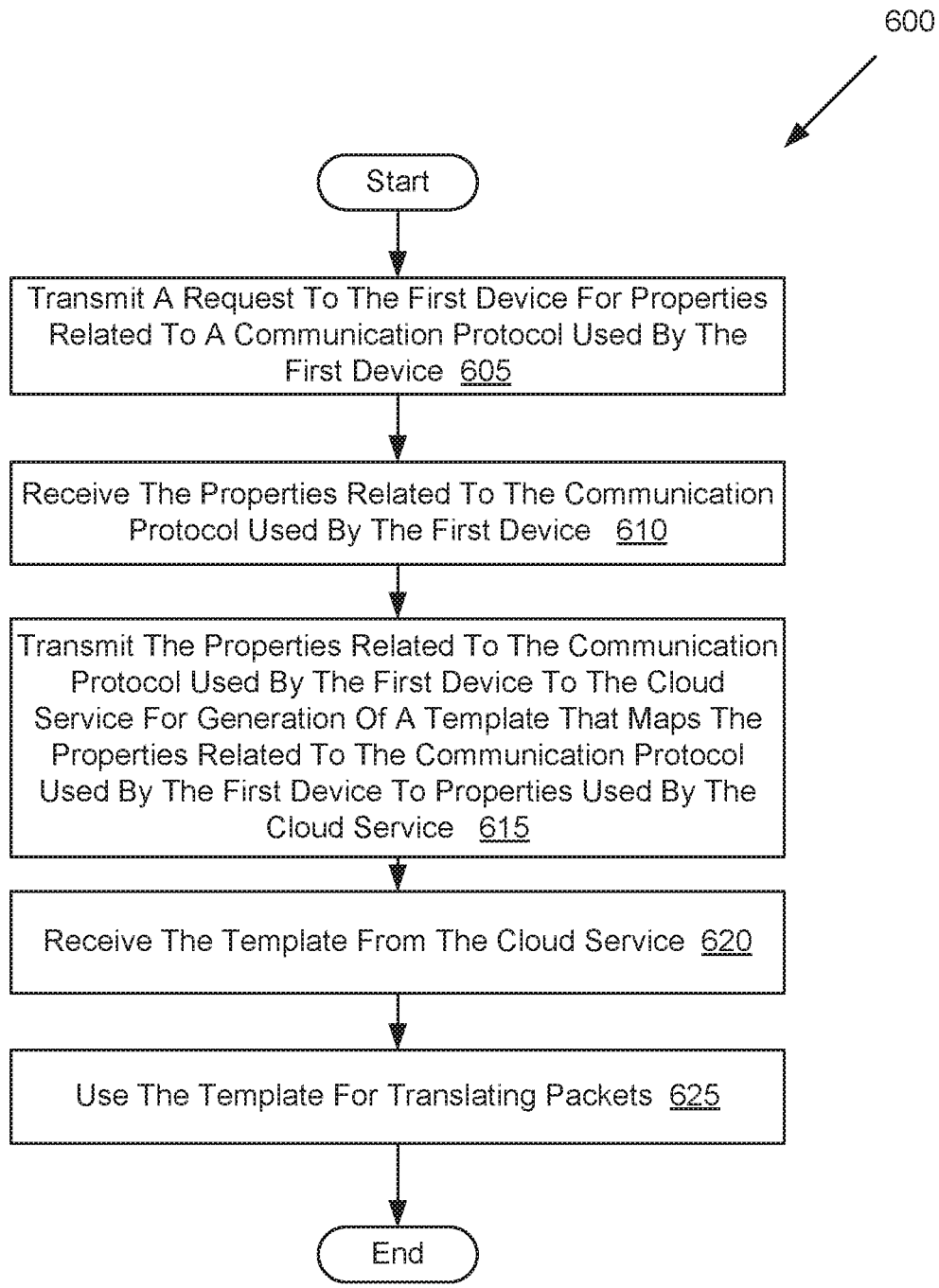
FIG. 6 is a flow chart of an example method of using a dynamically generated template to translate packets.

FIG. 6 is a flow chart of an example method 600 of using a dynamically generated template to translate data packets, in accordance with an embodiment. The method 600 may be performed by a processing logic that may comprise hardware (e.g., circuitry, dedicated logic, programmable logic, microcode, etc.), software (e.g., instructions run on a processing device to perform hardware simulation), or a combination thereof. In one embodiment, at least some operations of the method 600 are performed by a mobile computing device 150A executing a gateway application 120. In another embodiment, at least some operations of the method 600 are performed by a hardware gateway device 155A.

At block 605, processing logic transmits a request to a first device (e.g., device 135) for properties related to a communication protocol used by the first device. In some embodiments, the communication protocol may include BLUETOOTH®, ZIGBEE®, Thread, or the like. For example, BLUETOOTH® may specify a certain format of properties or characteristics having a name and a value. Some of the properties or characteristics may be strings of alphanumeric characters having defined lengths or may be large hexadecimal numbers.

At block 610, processing logic may receive the properties related to the communication protocol used by the first device. At block 615, processing logic may transmit the properties related to the communication protocol used by the first device to the cloud service 130 for generation of a template that maps the properties related to the communication protocol used by the first device to properties used by the cloud service 130. There may be multiple templates generated for a single communication protocol used by the first device or separate templates for different communication protocols used by the first device. Once generated, the cloud service 130 may send the one or more templates to the first device.

At block 620, processing logic may receive the template from the cloud service 130. At block 625, processing logic may use the template to translate data packets received from the first device and to translate data packets received from the cloud service 130. For example, processing logic may receive one or more data packets from the first device and translate the one or more packets using the template. The translation may reformat the data packets from a first format specific to the communication protocol used by the first device to transmit the data packets to a second format used by the cloud service 130. Then, the translated data packets may be provided to the cloud service 130.

Likewise, processing logic may receive one or more data packets from the cloud service 130 and may translate the one or more packets using the template. The processing logic may reformat the received data packets from a first format specific to the communication protocol used by the cloud service 130 to a second format specific to the communication protocol used by the first device. Then, the processing logic may provide the translated data packets to the first device.

Figure 7:
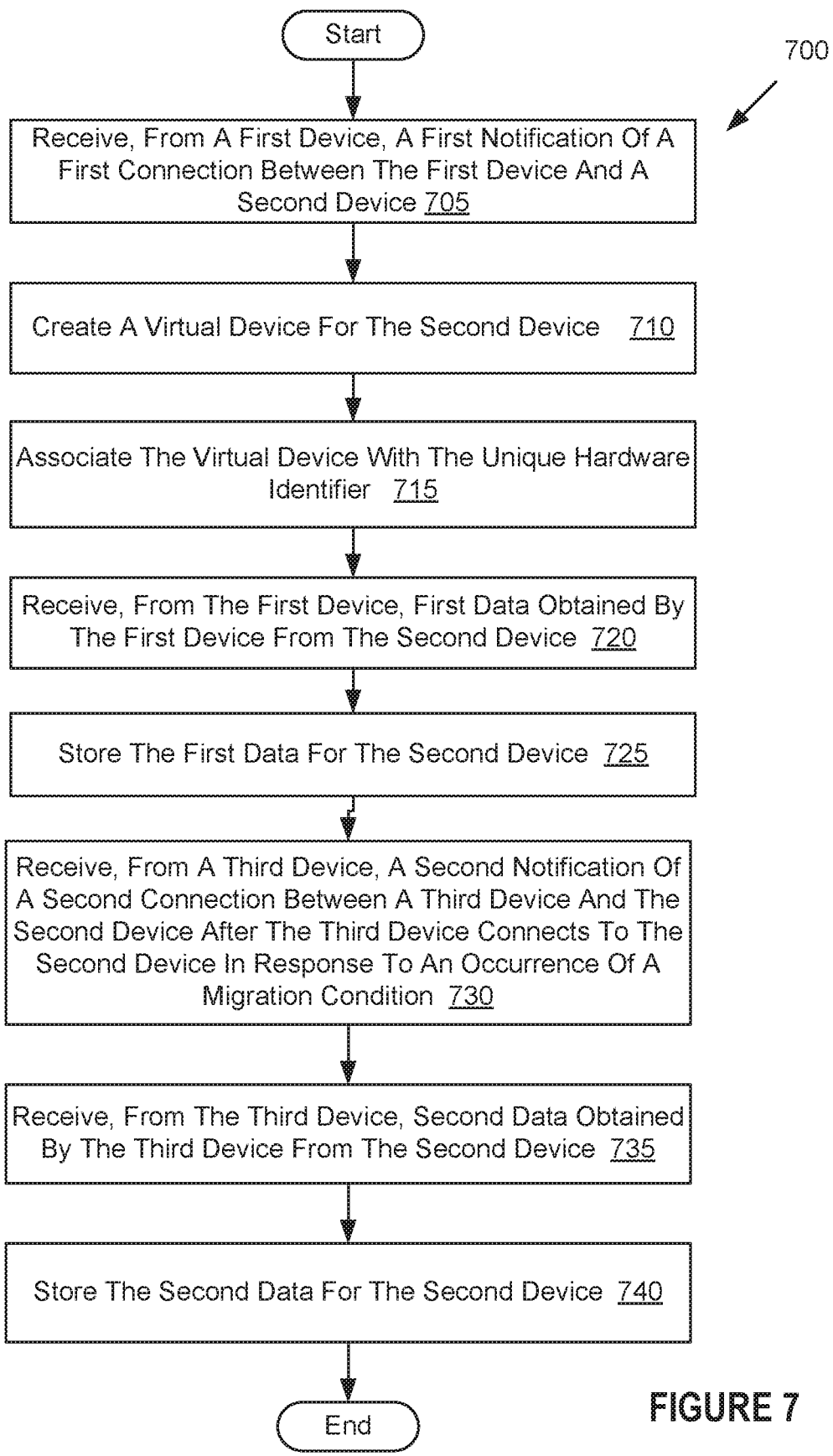
FIG. 7 is a flow chart of an example method for a server computing device storing data for a device received from various connected computing devices.

FIG. 7 is a flow chart of an example method 700 for a server computing device 125 storing data for a device 135 received from various connected computing devices, in accordance with an embodiment. The method 700 may be performed by a processing logic that may comprise hardware (e.g., circuitry, dedicated logic, programmable logic, microcode, etc.), software (e.g., instructions run on a processing device to perform hardware simulation), or a combination thereof. In one embodiment, at least some operations of the method 700 are performed by a server computing device 125 executing a cloud service 130.

It should be understood that prior to method 700 being performed, a first device (e.g., mobile computing device 150A) may be connected via the WAN 170 to the server computing device 125 executing the cloud service 130, and a third device (e.g., hardware gateway device 155A) may be connected via the WAN 170 to the server computing device 125 executing the cloud service 130. Although method 700 is described as the first device being the mobile computing device 150A and the third device being the hardware gateway device 155A, it should be understood that in some embodiments the first device and the third device may both be mobile computing devices, the first device and the third device may both be hardware gateway devices, or the first device may be the hardware gateway device 155A and the third device may be the mobile computing device 150A.

At block 705, processing logic receives, from a first device (e.g., mobile computing device 150A), a first notification of a first connection between the first device and a second device (e.g., device 135). The first device and the second device may pair using BLUETOOTH®, for example. The second device may lack resources to connect to the server computing device 125 directly. Further, the first notification may include a unique hardware identifier of the second device.

If processing logic does not recognize the unique hardware identifier provided in the first notification as being associated with another virtual device in the server computing device 125, then, at block 710, processing logic may create a virtual device 294 for the second device. At block 715, processing logic may associate the virtual device 294 with the unique hardware identifier 296 for the second device. Also, processing logic may register a user account (associated with the first device) with the virtual device 294. In an embodiment, the virtual device 294 may be registered with just one user account (e.g., an owner of the second device), but the virtual device 294 may be shared with other user accounts (e.g., guest user accounts), as discussed in more detail below. At block 720, processing logic may receive, from the first device, first data obtained by the first device from the second device. In such an embodiment, the first device (e.g., mobile computing device 150A) may be operating as a gateway by forwarding data received from the second device to the cloud service 130. At block 725, processing logic may store the first data for the second device. In some embodiments, processing logic may update states 297 and/or connections 298 in the virtual device 294 using the first data.

If processing logic does recognize the unique hardware identifier provided in the first notification as being associated with another virtual device (e.g., this is not the first time data is being sent to the cloud service 130 for the second device), then processing logic may receive the first data obtained by the first device from the second device. Also, processing logic may store the first data for the second device.

At block 730, processing logic may receive, from a third device (e.g., hardware gateway device 155A), a second notification of a second connection between the third device and the second device after the third device connects to the second device in response to an occurrence of a migration condition. The migration condition may include the first device exiting a defined proximity to the third device, the second device entering a defined proximity to the first device, the second device entering a defined proximity to the third device, the second device exiting a defined proximity to the third device, the first device entering a defined proximity to the third device, a preference of which computing device with which to establish a connection when the computing device is in a defined proximity to the second device, the first device reaching a threshold number of connections to devices, or any of the migration conditions described herein.

At block 735, processing logic receives, from the third device, second data obtained by the third device from the second device. At block 740, processing logic stores the second data for the second device. In some embodiments, processing logic may update states 297 and/or connections 298 in the virtual device 294 using the first data. As such, data history for the second device may persist in the server computing device 125 when the second device migrates from the first device to the third device.

Figure 8:
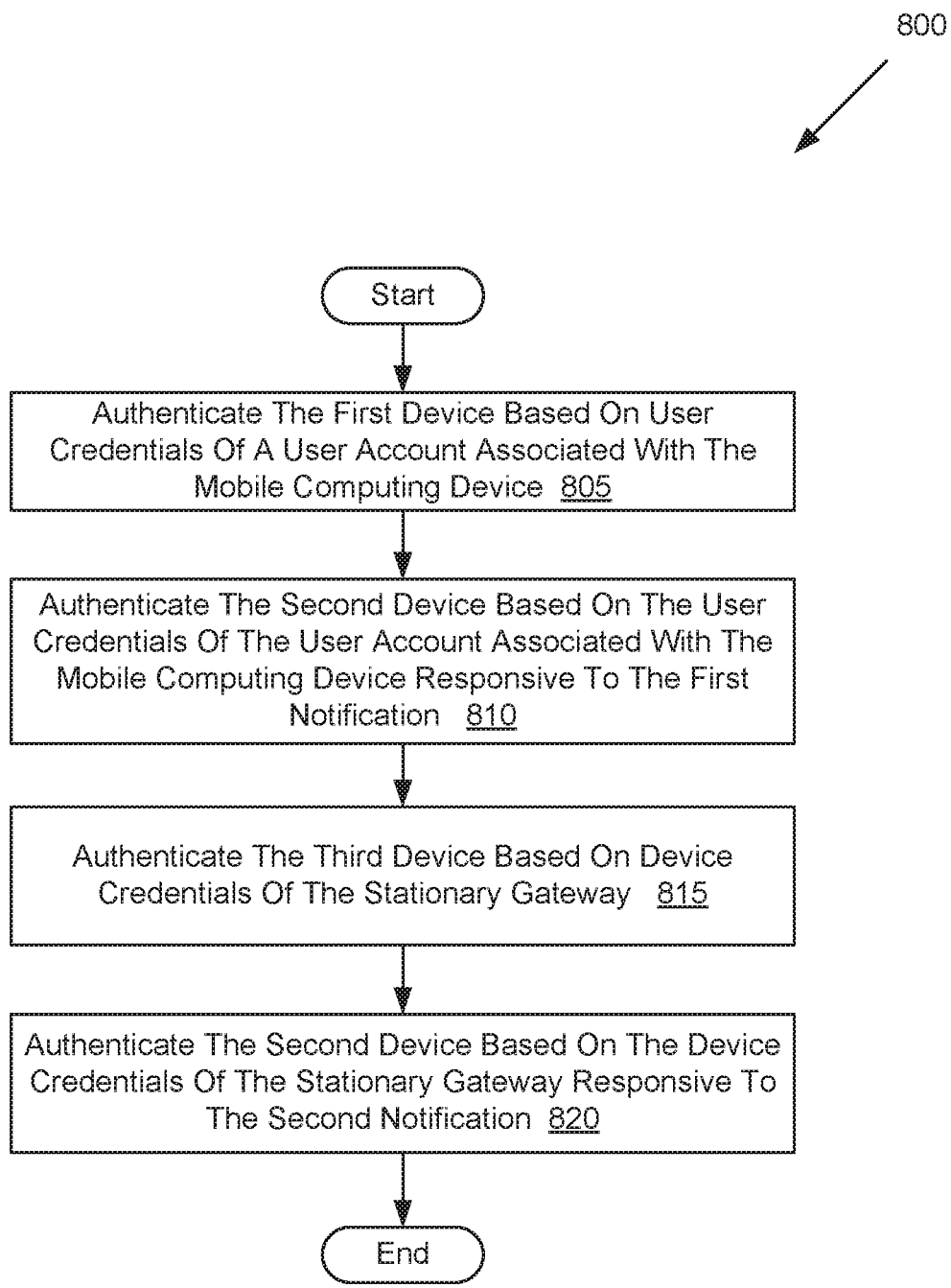
FIG. 8 is a flow chart of an example method for a server computing device using different authentication techniques to authenticate a device based on the type of connected computing device.

FIG. 8 is a flow chart of an example method 800 for a server computing device 125 using different authentication techniques to authenticate a device 135 based on the type of connected computing device, in accordance with an embodiment. The method 800 may be performed by a processing logic that may comprise hardware (e.g., circuitry, dedicated logic, programmable logic, microcode, etc.), software (e.g., instructions run on a processing device to perform hardware simulation), or a combination thereof. In one embodiment, at least some operations of the method 800 are performed by a server computing device 125 executing a cloud service 130.

It should be noted that method 800 may be performed in conjunction with method 700 of FIG. 7. For example, at block 805, processing logic may authenticate the first device (e.g., mobile computing device 150A) based on user credentials of a user account associated with the first device. Also, at block 810, processing logic may authenticate the second device based on the user credentials of the user account associated with the first device responsive to the first notification. If authentication fails, a message may be displayed to the user on the first device indicated such and the cloud service 130 may reject any data of the second device received from the first device. If authentication succeeds, the cloud service 130 may either register the second device (if it is the first time the cloud service 130 receives data of the second device) and/or store the first data of the second device, among other things.

At block 815, processing logic may authenticate the third device (e.g., hardware or stationary gateway device 155A) based on device credentials (e.g., device identifier and/or a key placed on the third device by the cloud service 130 when the third device first connects to the cloud service 130) of the third device. Also, at block 820, processing logic may authenticate the second device based on the device credentials of the third device responsive to the second notification. If authentication fails, the cloud service 130 may reject any data of the second device received from the first device. If authentication succeeds, the cloud service 130 may either register the second device (if it is the first time the cloud service 130 receives data of the second device) and/or store the second data of the second device, among other things.

Accordingly, the cloud service 130 may be capable of receiving data for the second device from different types of gateway devices (e.g., mobile computing device 150A and hardware gateway device 155A) using different authentication methods. Such a benefit enhances robustness of the techniques described herein.

Figure 9:
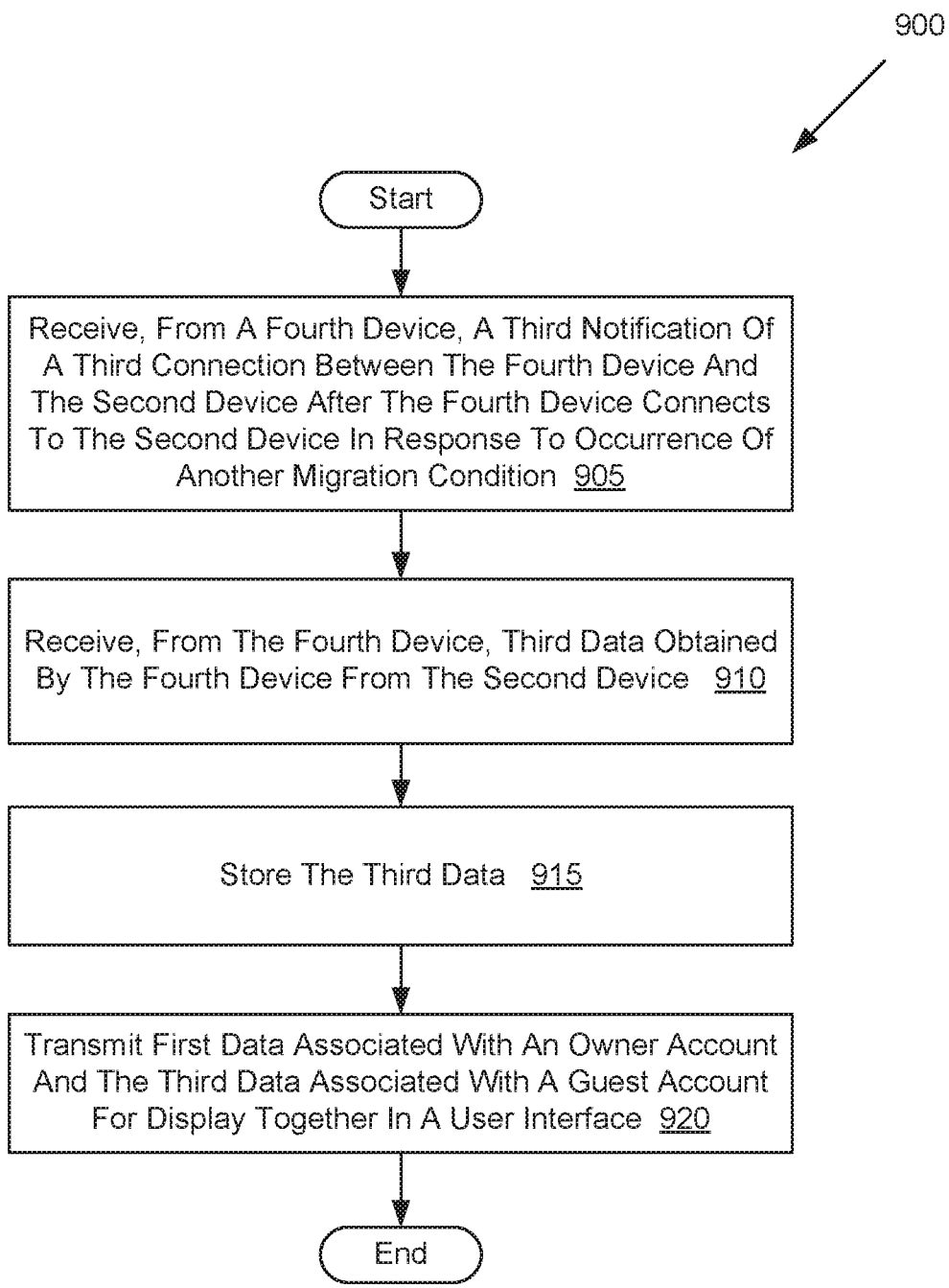
FIG. 9 is a flow chart of an example method for a server computing device storing data for a device received from various computing devices using different user accounts.

FIG. 9 is a flow chart of an example method 900 for a server computing device 125 storing data fora device 135 received from various computing devices using different user accounts, in accordance with an embodiment. The method 900 may be performed by a processing logic that may comprise hardware (e.g., circuitry, dedicated logic, programmable logic, microcode, etc.), software (e.g., instructions run on a processing device to perform hardware simulation), or a combination thereof. In one embodiment, at least some operations of the method 900 are performed by a server computing device 125 executing a cloud service 130.

It should be understood that prior to method 900 being performed, an owner of the second device may use the first device (e.g., mobile computing device 150A) to share the second device with a guest user account associated with another mobile computing device 150B. For example, a parent of a child may share a baby monitor with a guest user account of a babysitter.

At block 905, processing logic receives, from a fourth device (e.g., another mobile computing device 150B), a third notification of a third connection between the fourth device and the second device (e.g., device 135) after the fourth device connects to the second device in response to occurrence of another migration condition. The migration condition may be any of the migration conditions discussed herein. For example, the user associated with the mobile computing device 150A may leave the defined proximity to the baby monitor (device 135) and the baby monitor may connect to the mobile computing device 150B (fourth device) of the babysitter.

In some embodiments, processing logic may authenticate the fourth device using user based authentication and may also authenticate the second device. At block 910, processing logic may receive, from the fourth device, third data obtained by the fourth device from the second device. At block 915, processing logic may store the third data for the second device. The processing logic may associate the third data with the guest user account by appending the guest user account to the end of the third data, for example. The processing logic may use any suitable technique to partition the third data from the first data and second data that is associated with the user account of the owner of the second device.

At block 920, processing logic may transmit the first data associated with an owner user account and the third data associated with the guest user account for display together in a user interface. For example, the data may be displayed in a user interface of the mobile computing device 150A associated with the owner user account, the mobile computing device 150B associated with the guest user account, and so forth. In some instances, the owner may hide certain information from being displayed to the guest user accounts. For example, the owner may specify that the guest user account may just see data associated with that guest user account and not data associated with the owner user account.

FIG. 10 illustrates a diagrammatic representation of a machine in the example form of a computing device 1000 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The example computing device 1000 includes a processing device 1002, a main memory 1004 (e.g., read-only memory (ROM), flash memory, dynamic random access memory (DRAM) such as synchronous DRAM (SDRAM) or Rambus DRAM (RDRAM), etc.), a static memory 1006 (e.g., flash memory, static random access memory (SRAM), etc.), and a secondary memory (e.g., a data storage device 1018), which communicate with each other via a bus 1030.

Processing device 1002 represents one or more general-purpose processors such as a microprocessor, central processing unit, or the like. More particularly, the processing device 1002 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. Processing device 1002 is configured to execute the processing logic (instructions 1022) for performing the operations and steps discussed herein.

The computing device 1000 may further include a network interface device 1008. The computing device 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), and a signal generation device 1016 (e.g., a speaker).

The data storage device 1018 may include a machine-readable storage medium (or more specifically a computer-readable storage medium) 1028 on which is stored one or more sets of instructions 1022 embodying any one or more of the methodologies or functions described herein. The instructions 1022 may also reside, completely or at least partially, within the main memory 1004 and/or within the processing device 1002 during execution thereof by the computer system 1000, the main memory 1004 and the processing device 1002 also constituting computer-readable storage media.

In embodiments where the computing device 1000 is a mobile computing device 150A-Z, the computer-readable storage medium 1028 may also be used to store a gateway application 120 (as described with reference to FIGS. 1 and 2A), and/or a software library containing methods that call a gateway application. In embodiments where the computing device 1000 is a hardware gateway device 155A-Z, the computer-readable storage medium 1028 may also be used to store a gateway application 120 (as described with reference to FIG. 1), and/or a software library containing methods that call a gateway application. In embodiments where the computing device 1000 is the server computing device 125, the computer-readable storage medium 1028 may also be used to store a wan accessible service (cloud service 130) (as described with reference to FIGS. 1 and 2B), and/or a software library containing methods that call a cloud service.

While the computer-readable storage medium 1028 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies described herein. The term "computer-readable storage medium" shall accordingly be taken to include, but not be limited to, solid-state memories, and optical and magnetic media.

The modules, components and other features described herein (for example in relation to FIGS. 1, 2A, and 2B) can be implemented as discrete hardware components or integrated in the functionality of hardware components such as ASICS, FPGAs, DSPs or similar devices. In addition, the modules can be implemented as firmware or functional circuitry within hardware devices. Further, the modules can be implemented in any combination of hardware devices and software components, or only in software.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "connecting", "determining", "establishing", "communicating", or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the discussed purposes, or it may comprise a general purpose computer system selectively programmed by a computer program stored in the computer system. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

It is to be understood that the above description is intended to be illustrative, and not restrictive. Many other embodiments will be apparent to those of skill in the art upon reading and understanding the above description. Although the present invention has been described with reference to specific example embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A mobile computing device comprising:
   one or more interfaces to connect to one or more devices; and
   one or more processors, connected with the one or more interfaces, the one or more processors to:
      establish a first wireless connection with a first device, wherein the first device lacks resources to connect to a cloud service directly, wherein the first device comprises a first additional processor;
      obtain, from the first device, device data pertaining to the first device;
      provide the device data of the first device to the cloud service to cause the cloud service to create a virtual device object for the first device, wherein the virtual device object comprises a virtual representation of the first device to control the first device in response to modification of the virtual device object, wherein the virtual device object is associated with a device state for the first device, and wherein the device state of the first device is adjustable by at least one of the cloud service or the mobile computing device modifying the virtual device object;
      receive data from the first device;
      provide the data to the cloud service to cause the cloud service to adjust the device state of the virtual device object for the first device; and
      in response to detecting a migration condition, disconnect the first wireless connection to allow establishment of a second wireless connection between the first device and a second device such that the second device receives subsequent data from the first device and provides the subsequent data to the cloud service to cause the cloud service to adjust the device state of the first device by modifying the virtual device object for the first device, wherein the second device comprises a second additional processor.

2. The mobile computing device of claim 1, wherein the one or more processors are further to register, on behalf of the first device, the first device with the cloud service.

3. The mobile computing device of claim 2,
   wherein the device data comprises a unique hardware identifier of the first device; and
   wherein the virtual device object is associated with the unique hardware identifier of the first device, and the virtual device object is used by the cloud service when the mobile computing device provides access to the first device and when the second device provides access to the first device.

4. The mobile computing device of claim 1, wherein the one or more processors are further to authenticate the first device with the cloud service using user credentials of a user account associated with the mobile computing device.

5. The mobile computing device of claim 4, wherein the second connection between the first device and the second device causes authentication of the first device with the cloud service using device credentials of the second device.

6. The mobile computing device of claim 1, wherein the migration condition comprises at least one of:
the mobile computing device exiting a defined proximity to the first device;
the first device entering a defined proximity to the mobile computing device;
the first device entering a defined proximity to the second device;
the first device exiting a defined proximity to the second device;
the mobile computing device entering a defined proximity to the second device; or
the mobile computing device reaching a threshold number of connections to devices.

7. The mobile computing device of claim 1, wherein the one or more processors are further to:
transmit a request to the first device for properties related to a communication protocol used by the first device;
receive the properties related to the communication protocol used by the first device;
transmit the properties related to the communication protocol used by the first device to the cloud service for generation of a template that maps the properties related to the communication protocol used by the first device to properties used by the cloud service; and
receive the template from the cloud service.

8. The mobile computing device of claim 7, wherein the data is included in one or more packets and the one or more processors are further to:
translate the one or more packets using the template; and
provide the one or more packets to the cloud service.

9. The mobile computing device of claim 7, wherein the one or more processors are further to:
receive one or more packets from the cloud service;
translate the one or more packets using the template; and
provide the one or more packets to the first device.

10. The mobile computing device of claim 1, wherein the first device is unaware of its data being provided to the cloud service.

11. The mobile computing device of claim 1, wherein the one or more processors are further to, in response to detecting a second migration condition, reestablish the first connection with the first device, wherein reestablishing the first connection causes the second connection to disconnect.

12. A method, comprising:
receiving, at a server computing device from a first device, a first notification of a first connection between the first device and a second device, wherein the second device lacks resources to connect to the server computing device directly, and the first notification comprises a unique hardware identifier of the second device;
creating, at the server computing device, a virtual device object for the second device, wherein the virtual device object comprises a virtual representation of the first second device to control the second device in response to modification of the virtual device object, wherein the virtual device object is associated with a device state for the second device, and wherein the device state is adjustable by at least one of the server computing device or the first device modifying the virtual device object;
associating the virtual device object with the unique hardware identifier;
receiving, from the first device, first data obtained by the first device from the second device;
adjusting the device state of the second device by modifying the virtual device object for the second device based on the first data;
storing the first data for the second device;
receiving, at the server computing device from a third device, a second notification of a second connection between a third device and the second device after the third device connects to the second device in response to an occurrence of a migration condition, wherein the second notification comprises the unique hardware identifier of the second device;
receiving, from the third device, second data obtained by the third device from the second device;
adjusting the device state of the second device by modifying the virtual device object for the second device based on the second data; and
storing the second data for the second device.

13. The method of claim 12, wherein the first device is a mobile computing device operating as a mobile gateway and the third device is a stationary gateway.

14. The method of claim 13, further comprising:
authenticating the mobile computing device based on user credentials of a user account associated with the mobile computing device; and
authenticating the second device based on the user credentials of the user account associated with the mobile computing device responsive to the first notification.

15. The method of claim 13, further comprising:
authenticating the stationary gateway based on device credentials of the stationary gateway; and
authenticating the second device based on the device credentials of the stationary gateway responsive to the second notification.

16. The method of claim 12, wherein the migration condition comprises at least one of:
the first device exiting a defined proximity to the third device;
the second device entering a defined proximity to the first device;
the second device entering a defined proximity to the third device;
the second device exiting a defined proximity to the third device;
the first device entering a defined proximity to the third device; or
the first device reaching a threshold number of connections to devices.

17. The method of claim 12, further comprising:
performing analytics for the second device based on at least one of the first data or the second data.

18. The method of claim 12, further comprising:
receiving, at the server computing device from a fourth device, a third notification of a third connection between the fourth device and the second device after the fourth device connects to the second device in response to occurrence of another migration condition, wherein the third notification comprises the unique hardware identifier of the second device, and the fourth device comprises a mobile computing device operating as a mobile gateway;

receiving, from the fourth device, third data obtained by the fourth device from the second device, wherein first data is associated with an owner account logged into the first device, and the third data is associated with a guest user account logged into the fourth device;

storing the third data for the second device; and in response to a request, transmitting the first data and the third data for display together in a user interface.

19. The method of claim 12, further comprising:

registering a user account with the virtual device object, wherein the user account is associated with the first device.

20. A server computing device comprising:

one or more interfaces to connect to one or more devices; and one or more processors, connected with the one or more interfaces, the one or more processors to:

receive, from a first device, a first notification of a first connection between the first device and a second device, wherein the second device lacks resources to connect to the server computing device directly, and the first notification comprises a unique hardware identifier of the second device, wherein the first device comprises a first additional processor;

create a virtual device object for the second device wherein the virtual device object comprises a virtual representation of the second device to control the second device in response to modification of the virtual device object;

associate the virtual device object with the unique hardware identifier, wherein the virtual device object is associated with a device state for the second device, and wherein the device state of the second device is adjustable by at least one of the server computing device or the first device modifying the virtual device object;

receive, from the first device, first data obtained by the first device from the second device;

adjust the device state of the second device by modifying the virtual device object for the second device based on the first data;

store the first data for the second device;

receive, from a third device, a second notification of a second connection between the third device and the second device after the third device connects to the second device in response to occurrence of a migration condition, wherein the second notification comprises the unique hardware identifier of the second device, and wherein the third device comprises a second additional processor;

receive, from the third device, second data obtained by the third device from the second device;

adjust the device state of the second device by modifying the virtual device object for the second device based on the second data; and storing the second data for the second device.

* * * * *